United States Patent
Wang et al.

(10) Patent No.: US 11,681,171 B2
(45) Date of Patent: Jun. 20, 2023

(54) DISPLAY ASSEMBLY WITH DOUBLE-SIDED DISPLAY MODULE, BAFFLE MEMBER, DISPLAY APPARATUS AND VEHICLE

(71) Applicant: BOE TECHNOLOGY GROUP CO., LTD., Beijing (CN)

(72) Inventors: Zifeng Wang, Beijing (CN); Weiguo Li, Beijing (CN); Junmin Sun, Beijing (CN); Qiang Wang, Beijing (CN); Yunpeng Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 66 days.

(21) Appl. No.: 17/417,207

(22) PCT Filed: Jul. 22, 2020

(86) PCT No.: PCT/CN2020/103595
§ 371 (c)(1),
(2) Date: Jun. 22, 2021

(87) PCT Pub. No.: WO2021/013197
PCT Pub. Date: Jan. 28, 2021

(65) Prior Publication Data
US 2022/0050322 A1 Feb. 17, 2022

(30) Foreign Application Priority Data

Jul. 22, 2019 (CN) .......................... 201921160259.7
Jul. 23, 2019 (CN) .......................... 201921169198.0
(Continued)

(51) Int. Cl.
*G09G 3/30* (2006.01)
*G09G 3/36* (2006.01)
(Continued)

(52) U.S. Cl.
CPC .... *G02F 1/133308* (2013.01); *B60R 11/0235* (2013.01); *F16M 13/02* (2013.01);
(Continued)

(58) Field of Classification Search
CPC .......... G02F 1/133308; G02F 1/13452; B60R 11/0235; B60R 2011/0003;
(Continued)

(56) References Cited

U.S. PATENT DOCUMENTS

| 6,295,103 B1* | 9/2001 | Yamatani .......... G02F 1/133308 361/801 |
| 2010/0073594 A1* | 3/2010 | Miyazaki .......... G02F 1/133308 349/58 |

(Continued)

FOREIGN PATENT DOCUMENTS

| CN | 207225243 | 4/2018 |
| CN | 108818360 | 11/2018 |

(Continued)

OTHER PUBLICATIONS

PCT International Search Report (w/ English translation) for corresponding PCT Application No. PCT/CN2020/103595 dated Oct. 28, 2020, 8 pages.

*Primary Examiner* — Sanghyuk Park
(74) *Attorney, Agent, or Firm* — Dority & Manning, P.A.

(57) ABSTRACT

A display assembly includes a display device, a first clamping plate and a second clamping plate. The display apparatus has at least one display area, and the first clamping plate and the second clamping plate are disposed on two opposite sides of the display device in a thickness direction thereof. At least one of the first clamping plate and the second clamping plate is located on at least one light-emitting side of the display device, and in a clamping plate located on a light-emitting side of the display device, at least a partial (Continued)

region of a portion covering an active area of the display device is in a transparent state. Edges of the first clamping plate and the second clamping plate have at least one adapter portion, and adapter portions are configured to fix the display assembly to an object in an external environment through at least one adapter.

18 Claims, 24 Drawing Sheets

(30) Foreign Application Priority Data

Sep. 3, 2019 (CN) .......................... 201921464956.1
Sep. 5, 2019 (CN) .......................... 201921477391.0

(51) Int. Cl.
| | | |
|---|---|---|
| G02F 1/1333 | (2006.01) | |
| G09F 21/04 | (2006.01) | |
| B60R 11/02 | (2006.01) | |
| F16M 13/02 | (2006.01) | |
| G02F 1/1345 | (2006.01) | |
| G09F 9/30 | (2006.01) | |
| B60R 11/00 | (2006.01) | |

(52) U.S. Cl.
CPC ............ *G02F 1/13452* (2013.01); *G09F 9/30* (2013.01); *G09F 21/049* (2020.05); *G09G 3/3648* (2013.01); *B60R 2011/0003* (2013.01); *B60R 2011/0043* (2013.01); *G02F 1/133342* (2021.01); *G02F 2201/46* (2013.01); *G09G 2360/02* (2013.01); *G09G 2360/04* (2013.01); *G09G 2380/10* (2013.01)

(58) Field of Classification Search
CPC ... B60R 2011/0043; F16M 13/02; G09F 9/30; G09F 21/049; G09G 3/3648; G09G 2360/02; G09G 2360/04; G09G 2380/10
See application file for complete search history.

(56) References Cited

U.S. PATENT DOCUMENTS

| | | | |
|---|---|---|---|
| 2013/0229593 A1* | 9/2013 | Shimojoh | ........... G02F 1/13452 361/748 |
| 2018/0065881 A1* | 3/2018 | Hashimoto | ............. C03C 3/087 |
| 2019/0212605 A1 | 7/2019 | Shimojo et al. | |
| 2021/0347260 A1* | 11/2021 | Lambricht | ............. B60K 35/00 |
| 2022/0248542 A1* | 8/2022 | Hirota | ..................... H05K 5/04 |

FOREIGN PATENT DOCUMENTS

| | | |
|---|---|---|
| CN | 209946594 | 1/2020 |
| CN | 210123639 | 3/2020 |
| CN | 210149230 | 3/2020 |
| CN | 210467105 | 5/2020 |
| EP | 2902265 | 8/2015 |

* cited by examiner

DISPLAY ASSEMBLY WITH DOUBLE-SIDED DISPLAY MODULE, BAFFLE MEMBER, DISPLAY APPARATUS AND VEHICLE

CROSS-REFERENCE TO RELATED APPLICATIONS

This application is a national phase entry under 35 USC 371 of International Patent Application No. PCT/CN2020/103595, filed on Jul. 22, 2020, which claims priorities to Chinese Patent Application No. 201921160259.7, filed on Jul. 22, 2019, Chinese Patent Application No. 201921169198.0, filed on Jul. 23, 2019, Chinese Patent Application No. 201921464956.1, filed on Sep. 3, 2019, and Chinese Patent Application No. 201921477391.0, filed on Sep. 5, 2019, which are incorporated herein by reference in their entirety.

TECHNICAL FIELD

The present disclosure relates to the field of display technologies, and in particular, to a display assembly, a baffle member, a display apparatus and a vehicle.

BACKGROUND

Taking vehicles is a way for people to travel, and for vehicles such as buses and subways, more and more information is displayed on a vehicle-mounted display apparatus. The vehicle-mounted display apparatus is used for releasing advertisements, rebroadcasting and playing audio and video, and the like.

SUMMARY

In one aspect, a display assembly is provided. The display assembly includes a display device, a first clamping plate and a second clamping plate. The display device has at least one active area, and the first clamping plate and the second clamping plate are disposed on two opposite sides of the display device in a thickness direction thereof. At least one of the first clamping plate and the second clamping plate is located on light-exiting side(s) of the display device, respectively, and at least a partial region of a portion, covering an active area of the display device, in a clamping plate located on a light-exiting side of the display device is in a transparent state. Edges of the first clamping plate and the second clamping plate each have at least one adapter portion, and adapter portions are configured to fix the display assembly to an object in an external environment through adapter(s).

In some embodiments, the display device includes a display module and a signal converter board coupled to the display module. The signal converter board is disposed between the first clamping plate and the second clamping plate, and is arranged side by side with the display module. The signal converter board is configured to receive an image signal, and convert a format of the image signal to generate a screen driving control signal.

In some embodiments, the display module is a double-sided display module. The double-sided display module includes a first display module and a second display module that are arranged back to back, and an encapsulation housing. The encapsulation housing is disposed on a periphery of the first display module and the second display module, and the encapsulation housing is configured to fix the first display module and the second display module.

In some embodiments, the signal converter board has a first signal interface and a second signal interface. The first display module includes a first display panel, a first driving circuit board and a first flexible circuit board. The first driving circuit board is coupled to the first display panel, the first driving circuit board has a third signal interface, and the first flexible circuit board is coupled to the first signal interface and the third signal interface. The second display module includes a second display panel, a second driving circuit board and a second flexible circuit board. The second driving circuit board is coupled to the second display panel, the second driving circuit board has a fourth signal interface, and the second flexible circuit board is coupled to the second signal interface and the fourth signal interface.

In some embodiments, the first display panel and the second display panel each have an active area and a peripheral area disposed around the active area. The peripheral area includes a first sub-region and a second sub-region located on two opposite sides of the active area in a first direction. Two opposite sides of the double-sided display module in the first direction are a first side and a second side.

The first sub-region of the first display panel and the second sub-region of the second display panel are located at the first side of the double-sided display module, and the second sub-region of the first display panel and the first sub-region of the second display panel are located at the second side of the double-sided display module. Boundaries of the active areas of the first display panel and the second display panel completely overlap.

A portion of the first driving circuit board and a portion of the second driving circuit board are disposed in first sub-regions of corresponding display panels, respectively, the third signal interface is located at the first side of the double-sided display module, and the fourth signal interface is located at the second side of the double-sided display module.

The encapsulation housing includes a side wall facing side faces of the first display panel and the second display panel, and the side wall is provided with circuit board penetration opening(s). The circuit board penetration opening(s) are configured to allow the first flexible circuit board coupled to the third signal interface and the second flexible circuit board coupled to the fourth signal interface to penetrate.

In some embodiments, the circuit board penetration opening(s) include one circuit board penetration opening, and the circuit board penetration opening is disposed at a position on the side wall corresponding to the third signal interface.

After being coupled to the third signal interface, the first flexible circuit board directly passes through the circuit board penetration opening.

After being coupled to the fourth signal interface, the second flexible circuit board passes through a gap between the first display panel and the second display panel, and passes through the circuit board penetration opening.

In some embodiments, a dimension of the first sub-region in the first direction is greater than a dimension of the second sub-region in the first direction.

At the first side of the double-sided display module, in a direction that is away from the active area in the first direction, a portion, extending beyond the second display panel, in the first sub-region of the first display panel sequentially includes a first width portion and a second width portion. A thickness of the first width portion is greater than a thickness of the second width portion, and the third signal interface is disposed on the second width portion, and is located on a back face of the first display panel.

At the second side of the double-sided display module, in a direction that is away from the active area in the first direction, a portion, extending beyond the first display panel, in the first sub-region of the second display panel sequentially includes a third width portion and a fourth width portion. A thickness of the third width portion is greater than a thickness of the fourth width portion, and the fourth signal interface is disposed on the fourth width portion, and is located on a back face of the second display panel.

The double-sided display module further includes a first fixing member and a second fixing member. A portion of the second flexible circuit board located between a portion, coupled to the fourth signal interface, of the fourth signal interface and a portion, between the first display panel and the second display panel, of the second flexible circuit board is fixed on a surface, proximate to the first display panel, of the third width portion of the second display panel through the first fixing member. A portion of the second flexible circuit board located between the portion, between the first display panel and the second display panel, of the second flexible circuit board and a portion, located at the third signal interface, of the second flexible circuit board is fixed to a surface, proximate to the second display panel, of the first width portion of the first display panel through the second fixing member.

In some embodiments, the third signal interface and the fourth signal interface are located on a same straight line extending in the first direction.

In some embodiments, the double-sided display module further includes a plurality of connectors. Each connector includes a first surface and a second surface that are disposed opposite to each other, and a third surface and a fourth surface that are both connected to the first surface and the second surface and are disposed opposite to each other.

The connector further includes at least one first connection hole, at least one second connection hole and at least one third connection hole. The at least one first connection hole is disposed in the first surface and extends toward the second surface, the at least one second connection hole is disposed in the second surface and extends toward the first surface, and the at least one third connection hole is disposed in the third surface and extends toward the fourth surface.

The first display module further includes a plurality of first connection portions, and the second display module further includes a plurality of second connection portions. The encapsulation housing includes side walls opposite to side faces of the first display panel and the second display panel, and the encapsulation housing further includes a plurality of third connection portions disposed on the side walls. Positions of the plurality of connectors, the plurality of first connection portions, the plurality of second connection portions and the plurality of third connection portions are in one-to-one correspondence.

The connector is disposed on a side of a side wall of the encapsulation housing proximate to the first display panel and the second display panel, and the fourth surface of the connector is closer to the first display panel and the second display panel than the third surface. Each third connection portion corresponds to a third connection hole of a connector.

Each first connection portion is connected to a connector through first connection hole(s) in the connector, and each second connection portion is connected to a connector through second connection hole(s) in the connector. Or, each first connection portion is connected to a connector through second connection hole(s) in the connector, and each second connection portion is connected to a connector through first connection hole(s) in the connector.

Each third connection portion is connected to a connector through third connection hole(s) of the connector, so that the first display module and the second display module are fixed by the encapsulation housing.

In some embodiments, in a direction pointing from the fourth surface to the third surface, a thickness of the connector increases stepwise, and the thickness of the connector refers to a dimension of the connector in a direction pointing from the second surface to the first surface.

In some embodiments, the connector includes a fourth connection portion and a fifth connection portion that are sequentially disposed in the direction pointing from the fourth surface to the third surface. The fourth connection portion and the fifth connection portion are of an integral structure, a side face of the fourth connection portion away from the fifth connection portion is the fourth surface, and a side face of the fifth connection portion away from the fourth connection portion is the third surface.

A thickness of the fifth connection portion is greater than a thickness of the fourth connection portion. A portion of the first surface corresponding to the fourth connection portion is retracted toward the second surface relative to a portion of the first surface corresponding to the fifth connection portion. A portion of the second surface corresponding to the fourth connection portion is retracted toward the first surface relative to a portion of the second surface corresponding to the fifth connection portion. The first connection hole(s) and the second connection hole(s) are both disposed in the fourth connection portion.

In some embodiments, the first display panel and the second display panel each have an active area and a peripheral area disposed around the active area, and the peripheral area includes a first sub-region and a second sub-region located on two opposite sides of the active area in a first direction. Two opposite sides of the double-sided display module in the first direction are a first side and a second side.

A first sub-region of the first display panel and a first sub-region of the second display panel are located at the first side of the double-sided display module, and a second sub-region of the first display panel and a second sub-region of the second display panel are located at the second side of the double-sided display module. Boundaries of active areas of the first display panel and the second display panel completely overlap.

The plurality of first connection portions are disposed at sides of the first sub-region and the second sub-region of the first display panel away from the active area, and the plurality of second connection portions are disposed at sides of the first sub-region and the second sub-region of the second display panel away from the active area.

A first connection portion is connected to the fourth connection portion through the first connection hole(s), and a second connection portion is connected to the fourth connection portion through the second connection hole(s).

In some embodiments, the connector includes a sixth connection portion, a seventh connection portion and an eighth connection portion that are sequentially disposed in the direction pointing from the fourth surface to the third surface. The sixth connection portion, the seventh connection portion and the eighth connection portion are of an integral structure, a side face of the sixth connection portion away from the eighth connection portion is the fourth surface, and a side face of the eighth connection portion away from the sixth connection portion is the third surface.

A thickness of the eighth connection portion is greater than a thickness of the seventh connection portion, and the thickness of the seventh connection portion is greater than thickness(es) of the sixth connection portion. A portion of the first surface corresponding to the seventh connection portion is flush with a portion of the first surface corresponding to the eighth connection portion. A portion of the second surface corresponding to the seventh connection portion is retracted toward the first surface relative to a portion of the second surface corresponding to the eighth connection portion.

A portion of the first surface corresponding to the sixth connection portion is retracted toward the second surface relative to the portion of the first surface corresponding to the seventh connection portion. A portion of the second surface corresponding to the first connection portion is retracted toward the first surface relative to the portion of the second surface corresponding to the eighth connection portion.

The first connection hole(s) are disposed in the sixth connection portion, and the second connection hole(s) are disposed in the seventh connection portion.

In some embodiments, the sixth connection portion includes a first sub-portion and a second sub-portion that are sequentially arranged in the direction pointing from the fourth surface to the third surface, and the first sub-portion and the second sub-portion are of an integrated structure. A thickness of the first sub-portion is smaller than a thickness of the second sub-portion. A portion of the first surface corresponding to the first sub-portion is flush with a portion of the first surface corresponding to the second sub-portion. A portion of the second surface corresponding to the first sub-portion is retracted toward the first surface relative to a portion of the second surface corresponding to the second sub-portion. The portion of the second surface corresponding to the second sub-portion is flush with the portion of the second surface corresponding to the seventh connection portion.

In some embodiments, the first display panel and the second display panel each have an active area and a peripheral area disposed around the active area, and the peripheral area includes a first sub-region and a second sub-region located on two opposite sides of the active area in a first direction. A dimension of the first sub-region in the first direction is greater than a dimension of the second sub-region in the first direction. Two opposite sides of the double-sided display module in the first direction are a first side and a second side.

A first sub-region of the first display panel and a second sub-region of the second display panel are located at the first side of the double-sided display module, and a second sub-region of the first display panel and a first sub-region of the second display panel are located at the second side of the double-sided display module. Boundaries of active areas of the first display panel and the second display panel completely overlap.

The plurality of first connection portions are disposed at sides, away from the active area, of the first sub-region and the second sub-region of the first display panel, and the plurality of second connection portions are disposed at sides, away from the active area, of the first sub-region and the second sub-region of the second display panel.

At the first side of the double-sided display module, a first connection portion is connected to a seventh connection portion through the second connection hole(s), and a second connection portion is connected to a sixth connection portion through the first connection hole(s).

At the second side of the double-sided display module, a first connection portion is connected to a sixth connection portion through the first connection hole(s), and a second connection portion is connected to a seventh connection portion through the second connection hole(s).

In some embodiments, the encapsulation housing includes a first housing and a second housing. In a thickness direction of the double-sided display module and in a direction perpendicular to one side of the double-sided display module, sections of the first housing and the second housing are both L-shaped. A side wall of the first housing and a side wall of the second housing overlap at side faces of the first display module and the second display module, so that the first housing and the second housing enclose a space with a U-shaped cross section.

In a case where the encapsulation housing includes a circuit board penetration opening, overlapping side wall(s) of the first housing and/or the second housing is provided with a penetration sub-opening, and the penetration sub-opening forms at least part of the circuit board penetration opening.

In a case where the encapsulation housing includes third connection portions with a through-hole structure, overlapping side walls of the first housing and the second housing are each provided with a sub-through hole, and two sub-through holes corresponding in positions overlap to form a third connection portion.

In another aspect, a baffle member is provided. The baffle member includes the display assembly according to any one of the above embodiments, and at least one adapter disposed on a periphery of the display assembly. The adapter is configured to be connected to adapter portions in the first clamping plate and the second clamping plate of the display assembly to fix the display assembly to the object in the external environment.

In some embodiments, the adapter includes a first adapter plate and a second adapter plate that are disposed opposite to and separated from each other, a fixing pin disposed between the first adapter plate and the second adapter plate, and a fixing block connected to the first adapter plate and the second adapter plate. The fixing pin is connected to one of the first adapter plate and the second adapter plate. An adapter portion in the first clamping plate is a first through hole, an adapter portion in the second clamping plate is a second through hole, and the fixing pin penetrates through the first through hole and the second through hole, so that an edge of the display assembly is caught between the first adapter plate and the second adapter plate. The fixing block includes a fixing portion, and the adapter is fixed to the object in the external environment through the fixing portion.

In yet another aspect, a display apparatus is provided. The display apparatus includes the baffle member according to any one of the above embodiments, a controller coupled to the display device in the baffle member, and a connection line for connecting the controller and the display device.

In a case where the display device includes a signal converter board, the controller is coupled to the signal converter board. The controller is configured to receive an original image signal, and convert a format of the original image signal to generate an image signal.

In yet another aspect, a vehicle is provided. The vehicle includes a vehicle body and the display apparatus according to any one of the above embodiments disposed in the vehicle body. The vehicle body includes a shell body and a carriage body disposed inside the shell body. The display assembly of the baffle member of the display apparatus is fixed in the carriage body through the at least one adapter, and the controller of the display apparatus is disposed between the carriage body and the shell body.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but not limitations on actual sizes of products, an actual process of a method and actual timings of signals to which the embodiments of the present disclosure relate.

DETAILED DESCRIPTION

Figure 1:
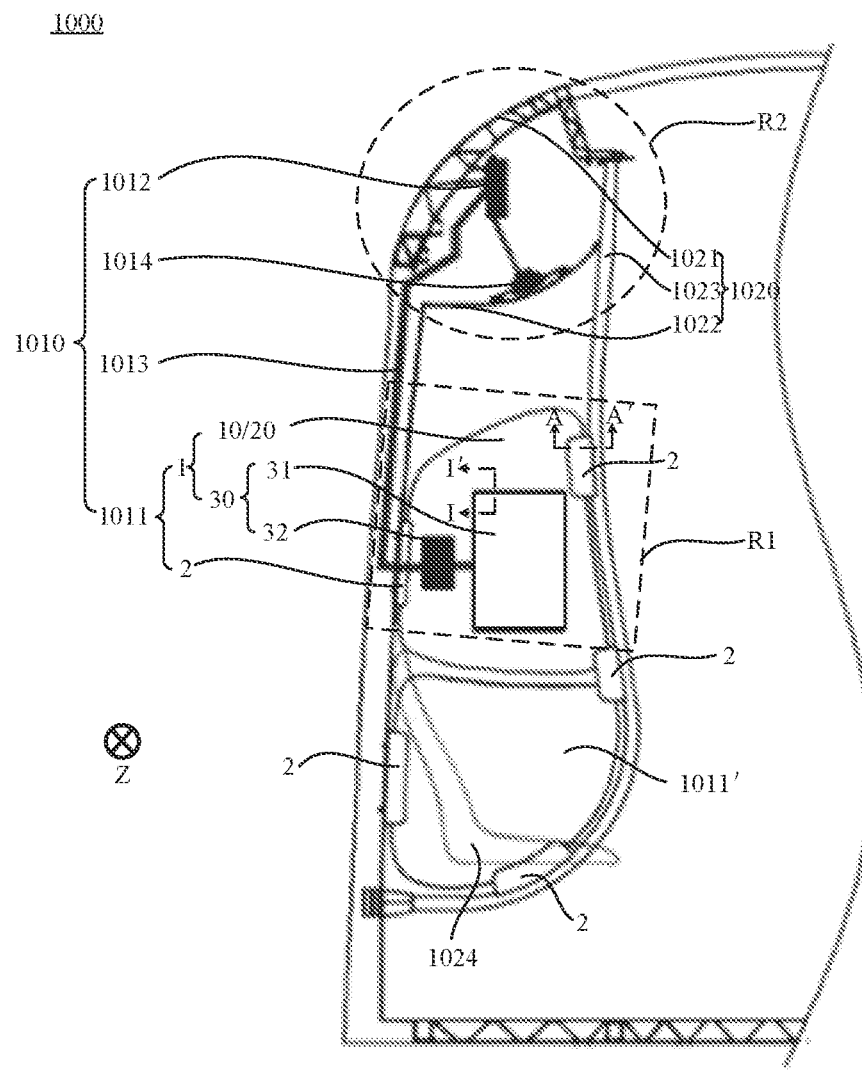
FIG. 1 is a diagram showing a structure of a vehicle, in accordance with some embodiments of the present disclosure.

The technical solutions in some embodiments of the present disclosure will be described dearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "inclusive, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined as "first" or "second" may explicitly or implicitly include one or more of the features. In the description of the embodiments of the present disclosure, the term "a plurality of" means two or more unless otherwise specified.

In the description of some embodiments, the terms "coupled" and "connected" and their extensions may be used. For example, the term "connected" may be used in the description of some embodiments to indicate that two or more components are in direct physical or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" means an open and inclusive language, which does not exclude devices that are applicable to or configured to perform additional tasks or steps.

Exemplary embodiments are described herein with reference to sectional views and/or plan views as idealized exemplary drawings. In the accompanying drawings, thicknesses of layers and regions are enlarged for clarity. Thus, variations in shape relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In the description of the present disclosure, it will be understood that, orientations or positional relationships indicated by the terms such as "center", "upper", "lower", "front", "rear", "left", "right", "vertical", "horizontal", "top", "bottom", "inner", "outer", and the like are based on orientations or positional relationships shown in the drawings, which are merely to facilitate and simplify the description of the present disclosure, and are not to indicate or imply that the referred devices or elements must have a particular orientation, or must be constructed or operated in a particular orientation. Therefore, they should not be construed as limitations on the present disclosure.

In the description of the present disclosure, the term "multiple" means two or more unless otherwise specified.

It will be noted that, in this article, terms such as "a thickness direction of a display device", "a thickness direction of a double-sided display module", "a thickness direction of a first display module and a second display module", "a thickness direction of a first display panel and a second display panel", "a thickness direction of a liquid crystal display panel" and the like are used, these directions all refer to a same direction, which may be regarded as a direction perpendicular to a display surface, and for details, reference may be made to the direction Z shown in FIGS. 1, 11, 17, 19, 20 and 24.

FIGS. 1 to 4 show structures of vehicles provided by some embodiments of the present disclosure.

Figure 4:
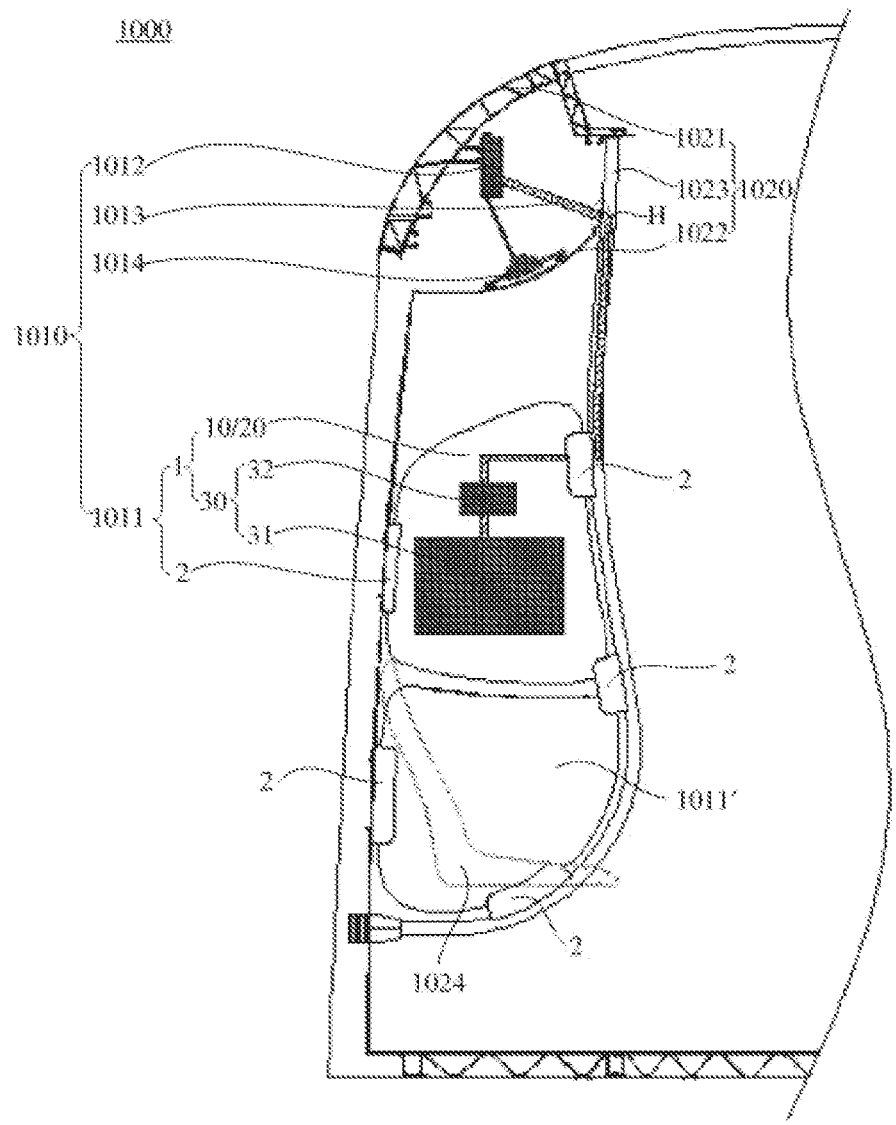
FIG. 4 is a diagram showing a structure of another vehicle, in accordance with some embodiments of the present disclosure.

As shown in FIGS. 1 and 4, some embodiments of the present disclosure provide a vehicle 1000, which may be a subway, a light rail, a bus, a high-speed rail, or the like. The vehicle 1000 includes a vehicle body 1020, and a display apparatus 1010 disposed in the vehicle body 1020.

The vehicle body 1020 includes a shell body 1021 and a carriage body 1022 disposed inside the shell body 1021.

The vehicle body 1020 may further include armrests 1023. In an example in which the vehicle is a subway or a light rail, there are multiple compartments in the carriage body 1022 of the subway or the light rail, and armrests 1023 are disposed beside seats in each compartment. An armrest 1023 may be vertically disposed in a middle region between a top and a bottom of the carriage body 1022, and two ends of the armrest 1023 are respectively connected to the top and the bottom of the carriage body 1022 (i.e., vertically arranged). The armrest 1023 may also have a certain shape and curvature. For example, as shown in FIGS. 1 and 4, the armrest 1023 extends in a vertical direction, one end thereof is connected to the top of the carriage body 1022, and the other end thereof is connected to a side portion of the carriage body 1022, so that more standing space may be provided for passengers.

In some embodiments, the vehicle body 1020 may further include seats 1024. A baffle 1011' may be provided at a side of a seat 1024, and the baffle 1011' may be an ordinary baffle without a display function, which plays a baffling role.

As shown in FIGS. 1 and 4, the display apparatus 1010 includes a baffle member 1011. The baffle member 1011 includes a display assembly 1 and at least one adapter 2 disposed on a periphery of the display assembly 1. The display assembly 1 is installed in the carriage body 1022 of the vehicle body 1020 through the at least one adapter 2 to achieve the installation of the baffle member 1011 in the carriage body 1022.

In a case where the vehicle body 1020 further includes the armrests 1023, the display assembly 1 may be installed between the carriage body 1022 and an armrest 1023 through at least one adapter 2, so that the display assembly 1 of the baffle member 1011 can not only form a barrier at a side of the seat 1024, but also have a display function. Further, a display device 30 in the display assembly 1 is a double-sided display device, so that double-sided display may be achieved, thereby facing more passengers, and for more passengers to view.

With continued reference to FIGS. 1 and 4, in a case where the baffle 1011' is provided between the carriage body 1022 and the armrest 1023, the display assembly 1 in the baffle member 1011 of the display apparatus 1010 may be disposed above the baffle 1011', so that a barrier may be formed beside the seat 1024, and space in the compartment may be saved while display is achieved.

Figure 21:
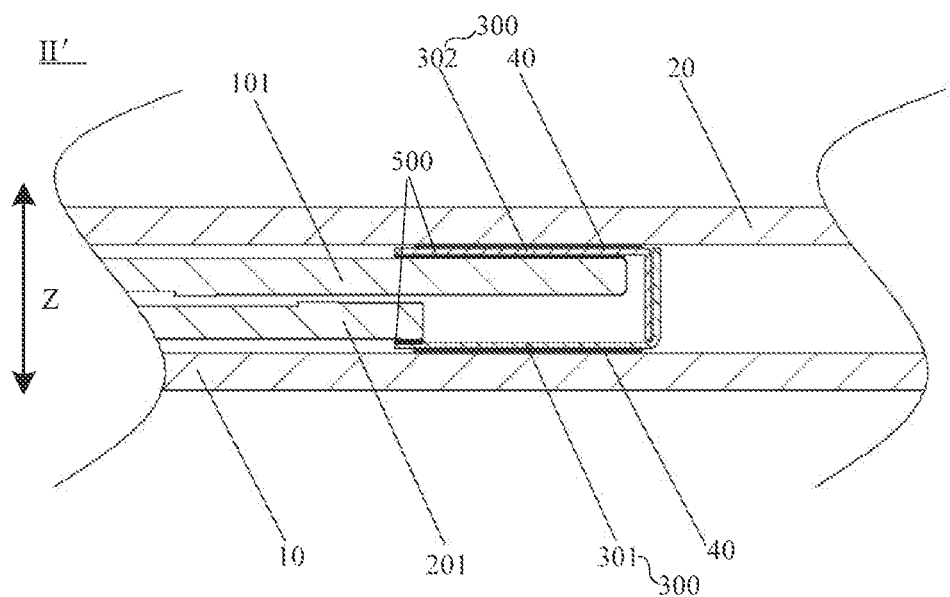
FIG. 21 is a sectional view of the display assembly in the vehicle shown in FIG. 1 taken along the section line II'.

In some embodiments, as shown in FIGS. 1, 4 and 21, the display assembly 1 includes a first clamping plate 10, a second clamping plate 20, and the display device 30 disposed between the first clamping plate and the second clamping plate.

Figure 5:
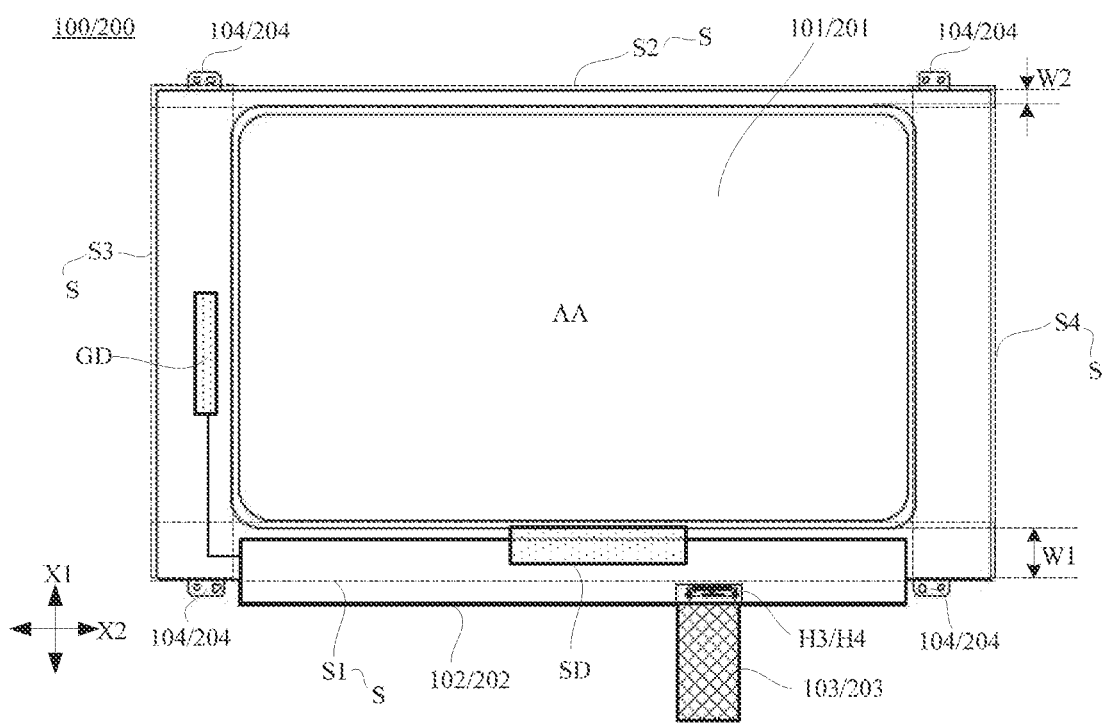
FIG. 5 is a diagram showing structures of a first display module and a second display module, in accordance with some embodiments of the present disclosure.
Figure 6:
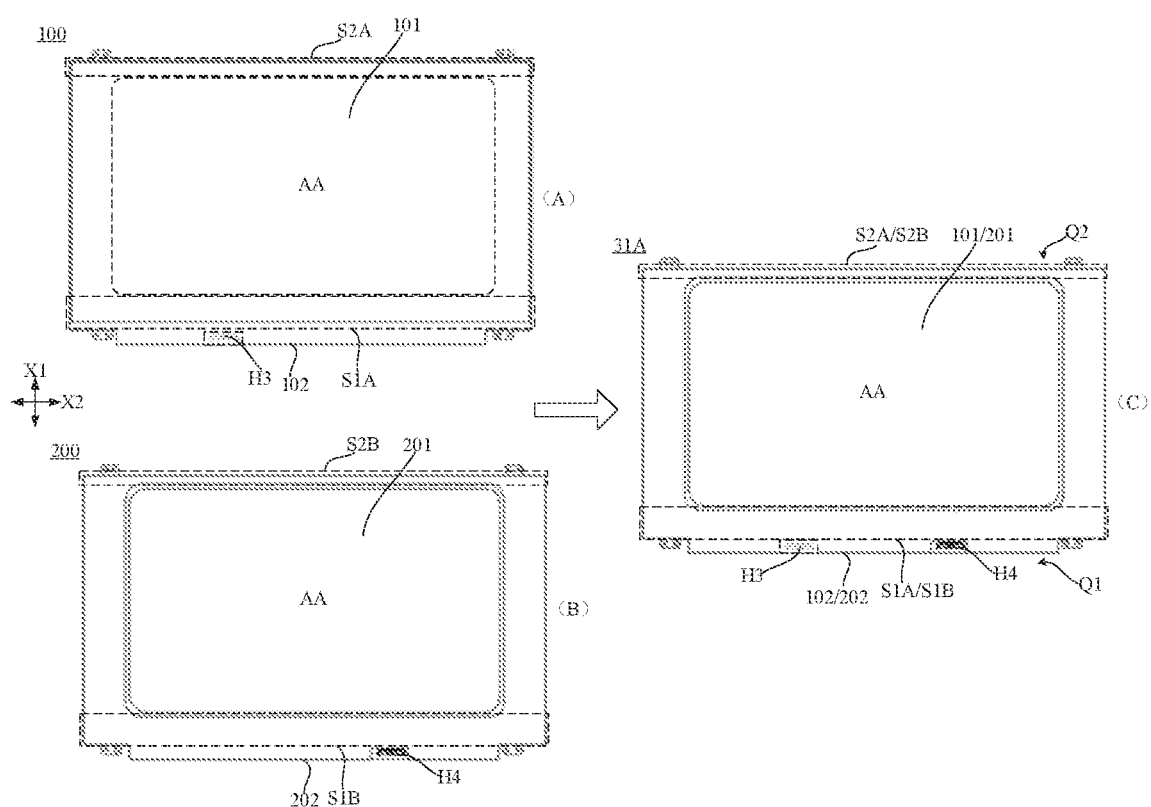
FIG. 6 is a diagram showing a structure in which a first display module and a second display module are arranged back to back, in accordance with some embodiments of the present disclosure.

As shown in FIGS. 5 and 6, the display device 30 has at least one active area AA. For example, the display device 30 is a single-sided display device and has one active area AA. For another example, the display device 30 is a double-sided display device and has two active areas AA.

Figure 2:
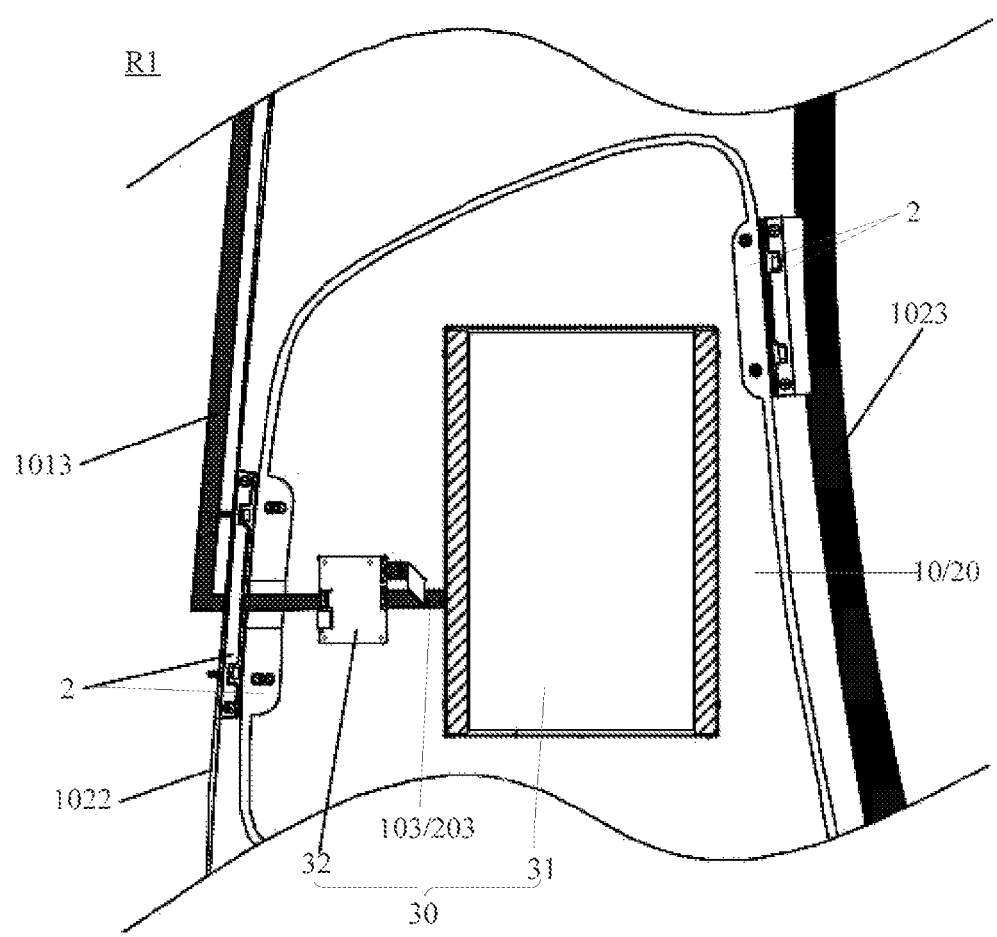
FIG. 2 is a partial enlarged view of region R1 in FIG. 1.

For example, as shown in FIGS. 1, 2 and 4, the display device 30 includes a display module 31 and a signal converter board 32 coupled to the display module 31. The signal converter board 32 is disposed between the first clamping plate 10 and the second clamping plate 20, and is arranged side by side with the display module 31. The signal converter board 32 is configured to receive an image signal from a controller 1012 (for functions of the controller 1012, reference may be made to related description of the controller 1012 below), convert a format of the image signal to generate a screen driving control signal, and transmit the screen driving control signal to the display module 31, so as to drive the display module 31 to display an image.

Figure 30:
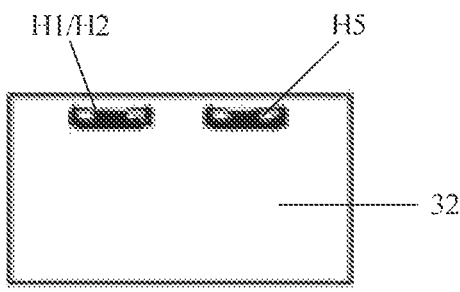
FIG. 30 is a diagram showing a structure of a signal converter board, in accordance with some embodiments of the present disclosure.

For example, the display module 31 may include a display panel and a driving circuit board for driving the display panel to display an image, and the signal converter board 32 may be coupled to the display module 31 by being coupled to the driving circuit board, so that the screen driving control signal generated by the signal converter board 32 may be transmitted to the driving circuit board, and the driving circuit board drives the display panel to display an image according to the screen driving control signal. As shown in FIG. 30, the signal converter board 32 may be provided with signal interface(s) (referring to a reference sign H1/H2), and the signal converter board 32 may be coupled to the driving circuit board through the signal interface(s). Depending on specific needs, the number of the interface(s) may be one or multiple, and FIG. 30 shows a case of only one signal interface.

As shown in FIGS. 1 and 21, the first clamping plate 10 and the second clamping plate 20 are disposed on two opposite sides of the display device 30 in a thickness direction Z thereof.

At least one of the first clamping plate 10 and the second clamping plate 20 is located on light-exiting side(s) of the display device 30, respectively, and at least a partial region of a portion, covering an active area AA of the display device 30, in a clamping plate located on a light-exiting side of the display device 30 is in a transparent state. For example, an entire region of the portion covering the active area AA of the display device 30 is in the transparent state. In this way, it is facilitated for the display device 30 to display images through the clamping plate located on the light-exiting side of the display device 30, so that the passengers may view the images.

In an example in which the display device 30 is the single-sided display device, and the first clamping plate 10 is located on the light-exiting side of the display device 30, a region, facing the active area AA of the display device 30, in the first clamping plate 10 (i.e., a region completely covering the active area AA in the first clamping plate 10) is in the transparent state, and the second clamping plate 20 and a remaining region of the first clamping plate 10 may both be opaque.

For example, in a case where the display device 30 includes the display module 31 and the signal converter board 32, portions covering the signal converter board 32 in the first clamping plate 10 and the second clamping plate 20 in the display assembly 1 are both in the opaque state, so that the first clamping plate 10 and the second clamping plate 20 may be used to shield the signal converter board 32, and the signal converter board 32 is prevented from being seen by the passengers.

For example, the first clamping plate 10 and the second clamping plate 20 may both be tempered glass, which may not only ensure that the display assembly 1 has sufficient mechanical strength, but also meet a need for transparency of the portions covering the active area AA in the clamping plates. In addition, the tempered glass may be surface-treated, so that regions that are not required light transmission of the first clamping plate 10 and the second clamping plate 20 are in the opaque state.

Edges of the first clamping plate 10 and the second clamping plate 20 each have at least one adapter portion. The adapter portions are configured to fix the display assembly 1 to an object (e.g., the carriage body 1022 or the armrest 1023) in an external environment (e.g., the carriage body 1022 of the vehicle body 1020) through the adapter(s) 2.

As shown in FIGS. 1 and 4, the display apparatus 1010 further includes the controller 1012. The controller 1012 may be disposed between the carriage body 1022 and the shell body 1021 of the vehicle body 1020. That is, the controller 1012 and the display device 30 in the baffle member 1011 are separately arranged.

Figure 3:
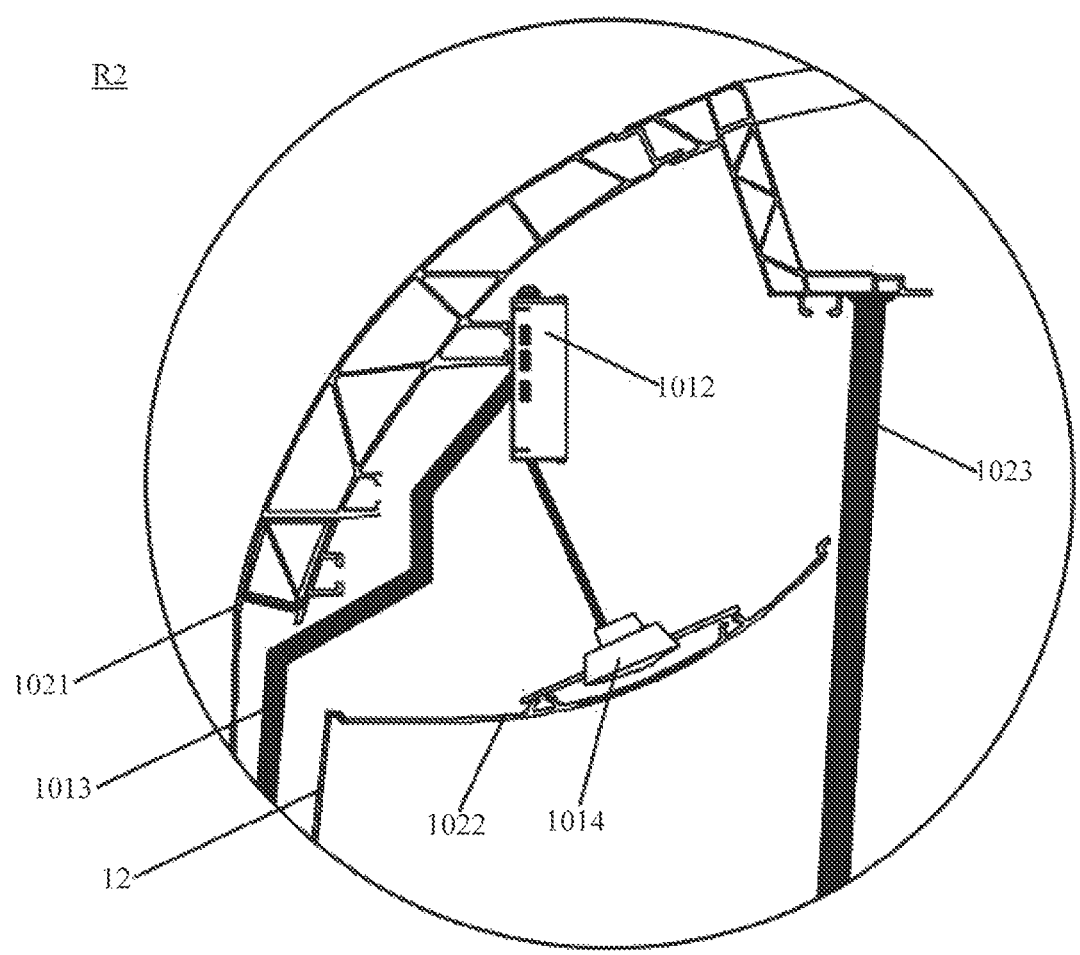
FIG. 3 is a partial enlarged view of region R2 in FIG. 1.

Optionally, as shown in FIGS. 1, 3 and 4, the controller 1012 is disposed between the top of the carriage body 1022 of the vehicle body 1020 and the shell body 1021, so as to reasonably utilize an interior space of the vehicle body 1020 and occupy a top of the interior space as much as possible without occupying a middle and a lower portion of the interior space. For example, the controller 1012 may be disposed in a roof box with sufficient storage space therein.

The controller 1012 is coupled to the display device 30 in the display assembly 1 of the baffle member 1011. The controller 1012 is configured to receive an original image signal, and convert a format of the original image signal to generate the image signal. The image signal is transmitted to the display device 30 in the baffle member 1011 to drive the display device 30 to display an image.

In the case where the display device 30 includes the display module 31 and the signal converter board 32, the controller 1012 is coupled to the signal converter board 32, and the signal converter board 32 is coupled to the display module 31. In this way, the controller 1012 receives an image signal (i.e., an original image signal such as an original data signal, an original control signal, etc.) in a first format (e.g., a high-definition multimedia interface (HDMI) signal format, a digital video interface (DVI) signal format, etc.) of an image to be displayed, and converts the image signal in the first format into an image signal in a second format (e.g., an electronic data processing (EDP) signal format, a low voltage differential signaling (LVDS) signal format, etc.) (i.e., generating an image signal), and transmits the image signal to the signal converter board 32. The signal converter board 32 converts the image signal in the second format into the screen driving control signal in a third format (e.g., one of a data signal, a control signal, and a clock signal). The screen driving control signal is transmitted to the display module 31 to drive the display module 31 to display an image.

It will be seen that, by providing the controller 1012, the signal converter board 32 and the display module 31 in the display device 30 that are connected in sequence, conversion between signals in different formats may be achieved.

Figure 31:
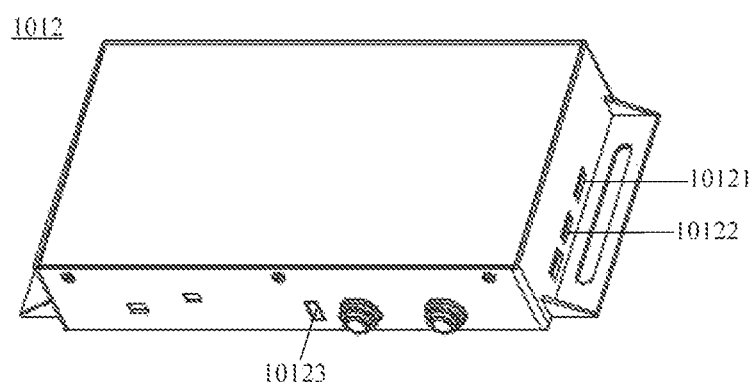
FIG. 31 is a diagram showing an external structure of a controller, in accordance with some embodiments of the present disclosure.

For example, as shown in FIG. 31, the controller 1012 may include a processor, and a housing of the controller 1012 is provided with a network interface 10121 and a universal serial bus (USB) interface 10122 that are electrically connected to the processor, and the controller 1012 interacts with the outside through the network interface 10121 and the USB interface 10122.

A network signal is acquired through the network interface 10121, so that a display signal rebroadcast through network can be received, thereby achieving display according to the display signal rebroadcast through the network. Storage and export of an image signal to be displayed may be achieved through the USB interface 10122, so that display may be achieved according to the stored image signal.

For example, in order to achieve image display, the controller 1012 may further include a memory, and the memory may be used to store the image to be displayed.

For example, as shown in FIG. 31, the controller 1012 may further include an infrared sensor module 10123, and the infrared sensor module 10123 is configured to receive external infrared sensing signals and control turning on and off of the controller 1012.

Since the controller 1012 has multiple and complicated functions to implement, the controller 1012 has a large thickness. By providing the controller 1012 with a large thickness between the shell body 1021 and the carriage body 1022 of the vehicle body 1020, the space in the carriage body 1022 may be saved. In addition, it is beneficial to reduce a volume of the display device 30 that the controller 1012 and the display device 30 in the baffle member 1011 are arranged separately, so that the baffle member 1011 including the display device 30 has a small thickness, which is easy to install and use as a baffle.

As shown in FIGS. 1 and 4, the display apparatus 1010 further includes a connection line 1013 for connecting the controller 1012 and the display device 30 in the baffle member 1011. In the case where the display device 30 includes the display module 31 and the signal converter board 32, one end of the connection line 1013 is connected to the controller 1012, and the other end thereof is connected to the signal converter board 32, thereby achieving coupling between the controller 1012 and the display device 30.

In a case where the controller 1012 is disposed between the shell body 1021 and the carriage body 1022 of the vehicle body 1020, and the display device 30 is disposed between the first clamping plate 10 and the second clamping plate 20, manners in which the connection line 1013 connects the controller 1012 to the display device 30 include, but are not limited to, the following two manners.

In a first manner, as shown in FIGS. 1 to 3, the connection line 1013 of the display apparatus 1010 is coupled to the display device 30 in the display assembly 1 after being coupled to the controller 1012, passing through a gap between the carriage body 1022 and the shell body 1021, passing through an inside of an adapter 2 connecting the display assembly 1 and the carriage body 1022, and entering between the first clamping plate 10 and the second clamping plate 20 in the display assembly 1.

In a second manner, as shown in FIG. 4, a hole H is provided at a position on the armrest 1023 proximate to the controller 1012, and the armrest 1023 has a hollow structure. The connection line 1013 of the display apparatus 1010 is coupled to the display device 30 in the display assembly 1 after being coupled to the controller 1012, passing through the hole H, sequentially passing through an inside of the armrest 1023 and an inside of an adapter 2 connecting the display assembly 1 and the armrest 1023, and entering between the first clamping plate 10 and the second clamping plate 20 in the display assembly 1.

Through the above arrangements of the connection line 1013, not only the coupling between the controller 1012 and the display device 30 is achieved, but also most of the connection line 1013 is routed in the gap between the carriage body 1022 and the shell body 1021 or the inside of the armrest 1023, thereby preventing the connection line 1013 from being seen by the passengers. In order to further prevent the connection line 1013 from being seen by the passengers, portions, covering the connection line 1013, of the first clamping plate 10 and the second clamping plate 20 may be made to be opaque.

As shown in FIGS. 1, 3 and 4, in order to play audio while the image display is implemented, the display apparatus 1010 further includes a speaker 1014.

The speaker 1014 includes a sound outlet. The speaker 1014 is disposed between the top of the carriage body 1022 and the shell body 1021 of the vehicle body 1020, and the speaker 1014 is coupled to the controller 1012. The controller 1012 is further used to provide an audio control signal to the speaker 1014. The speaker 1014 plays audio under control of the audio control signal.

The sound outlet of the speaker 1014 is arranged to face the carriage body 1022, so that an audio radiation range of the speaker 1014 can be increased, and it is possible to prevent passengers proximate to the speaker from being disturbed due to excessively loud sound, and prevent audio radiation for passengers away from the speaker from being excessively hindered.

In some embodiments, the display apparatus 1010 may further include a power supply and a power management module coupled to the power supply, and the power management module is configured to provide a power signal to the display device 30 in the baffle member 1011.

In a case where the display device 30 includes the display module 31 and the signal converter board 32, and the display module 31 includes the driving circuit board, the power management module is configured to provide a power signal to the driving circuit board of the display module 31.

The power management module may be directly electrically connected to the driving circuit board, or may be electrically connected to the driving circuit board through the signal converter board 32. As shown in FIG. 30, in a case where the power management module is electrically connected to the driving circuit board through the signal converter board 32, the signal converter board 32 may further be provided with a power interface H5 to achieve the electrical connection between the power management module and the driving circuit board through the power interface H5 of the signal converter board 32.

In order to save the space in the carriage body 1022, the power supply and the power management module may also be arranged between the shell body 1021 and the carriage body 1022 of the vehicle body 1020.

Optionally, the power supply and the power management module are integrated in the controller 1012 of the display apparatus 1010.

It will be noted that, in the above structures, the network interface 10121, the USB interface 10122 and the infrared sensor module 10123 of the controller 1012, and the speaker 1014 may all be electrically connected to the power management module, so as to provide corresponding power signals to the network interface 10121, the USB interface 10122, the infrared sensor module 10123 and the speaker 1014 through the power management module, respectively.

It will be seen from the above description that, the display device 30 in the display assembly 1 of the baffle member 1011 may be a double-sided display device, so that in a case where the baffle member 1011 is installed as a baffle inside the carriage body 1022, more passengers may view the images. Based on the design in which the display device 30 includes the display module 31 and the signal converter board 32, in order to make the display device 30 have a double-sided display function, the display module 31 included in the display device 30 needs to be a double-sided display module.

Some relevant structures of the display module 31 when it is a double-sided display module will be exemplarily introduced below.

FIGS. 5 to 12 show structures of double-sided display modules 31A and connection structures thereof with respective signal converter boards 32 in some embodiments of the present disclosure.

As shown in FIGS. 5, 6, 8, 11 and 12, some embodiments of the present disclosure provide a double-sided display module 31A. The double-sided display module 31A includes a first display module 100 and a second display module 200 that are arranged back to back, and an encapsulation housing 300 disposed on a periphery of the first display module 100 and the second display module 206. The encapsulation housing 300 is configured to fix the first display module 100 and the second display module 200.

As mentioned in the above description, the display device 30 includes the display module 31 and the signal converter board 32. Based on this design, in the case where the display module 31 is the double-sided display module including the first display module 100 and the second display module 200, as shown in FIG. 5, the first display module 100 includes a first display panel 101, a first driving circuit board 102 and a first flexible circuit board 103, and the first driving circuit board 102 has a third signal interface H3. The second display module 200 includes a second display panel 201, a second driving circuit board 202 and a second flexible circuit board 203, and the second driving circuit board 202 has a fourth signal interface H4.

Figure 7:
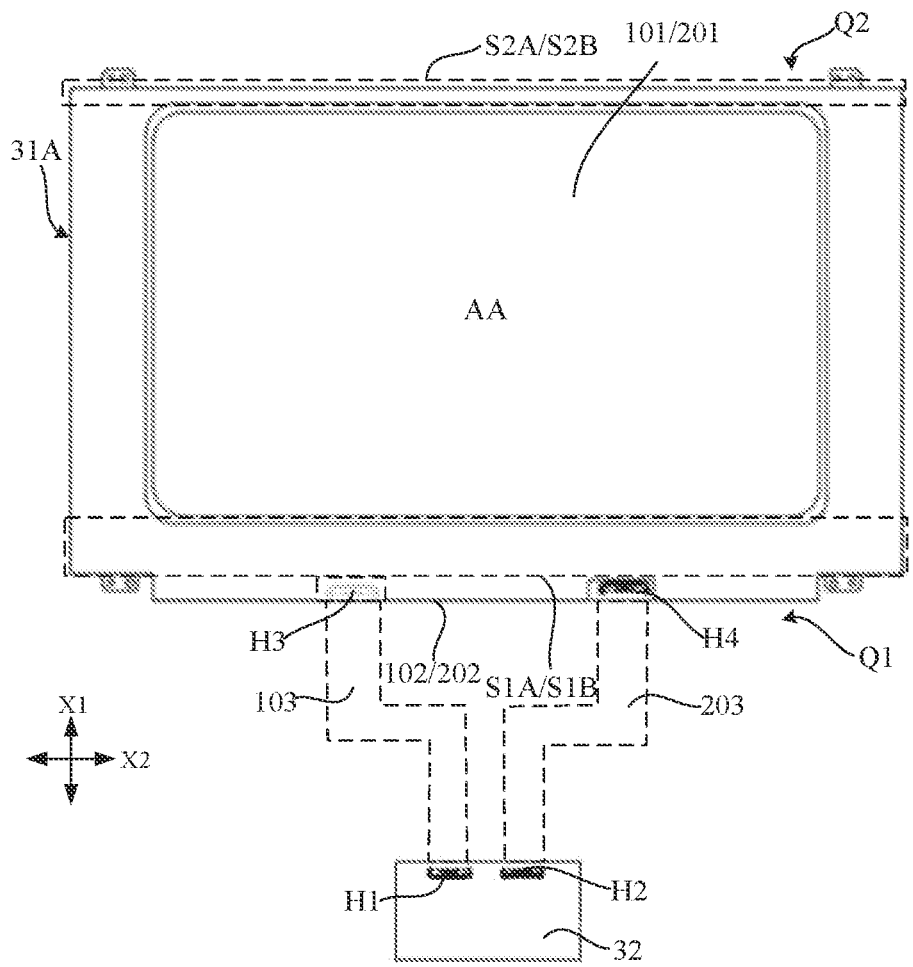
FIG. 7 is a diagram showing a structure in which a double-sided display module is connected to a signal converter board, in accordance with some embodiments of the present disclosure.
Figure 10:
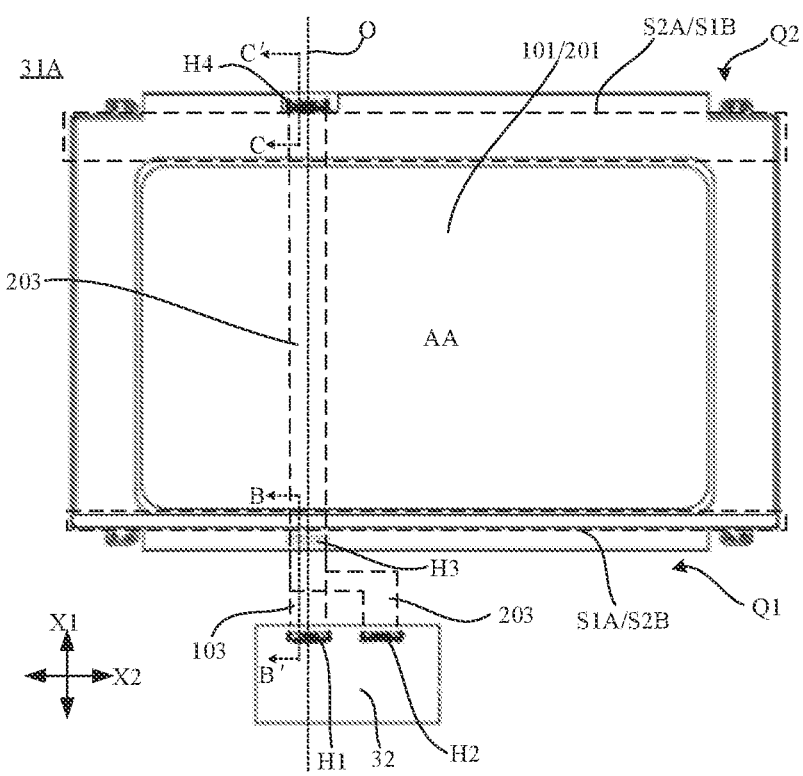
FIG. 10 is a diagram showing yet another structure in which a double-sided display module is connected to a signal converter board, in accordance with some embodiments of the present disclosure.

Correspondingly, as shown in FIGS. 7 and 10, the signal converter board 32 has a first signal interface H1 and a second signal interface H2. The first flexible circuit board 103 is used to couple the first signal interface H1 to the third signal interface H3, so as to couple the signal converter board 32 to the first driving circuit board 102. Thus, a screen driving control signal, converted by the signal converter board 32, for driving the first display panel 101 may be transmitted to the first driving circuit board 102 through the first signal interface H1, the first flexible circuit board 103 and the third signal interface H3. The second flexible circuit board 203 is used to couple the second signal interface H2 to the fourth signal interface H4, so as to couple the signal converter board 32 to the second driving circuit board 202. Thus, a screen driving control signal, converted by the signal converter board 32, for driving the second display panel 201 may be transmitted to the second driving circuit board 202 through the second signal interface H2, the second flexible circuit board 203 and the fourth signal interface H4.

For convenience of subsequent description, as shown in FIG. 5, hereinafter an example is considered, in which the first display panel 101 and the second display panel 201 are display panels with identical structure and model, and the first display panel 101 and the second display panel 201 each have an active area AA and a peripheral area S disposed around the active area AA. Peripheral areas S of the first display panel 101 and the second display panel 201 each include a first sub-region S1 and a second sub-region S2 located on two opposite sides of the active area AA in a first direction X1.

In some embodiments, the peripheral area S may further include a third sub-region S3 and a fourth sub-region S4 located on two opposite sides of the active area AA in a second direction X2. The first direction X1 and the second direction X2 intersect. For example, they are perpendicular to each other.

The first direction X1 may be, for example, a vertical direction of the active area AA, and the second direction X2 may be, for example, a horizontal direction of the active area AA. FIG. 5 shows an example in which the first sub-region S1 and the second sub-region S2 are respectively located on an upper side and a lower side of the active area AA, and the third sub-region S3 and the fourth sub-region S4 are respectively located on a left side and a right side of the active area AA.

Based on this, a portion of the first driving circuit board 102 of the first display module 100 is disposed in the first sub-region S1 of the first display panel 101 of the first display module 100, and a portion of the second driving circuit board 202 of the second display module 200 is disposed in the first sub-region S1 of the second display panel 201.

Figure 11:
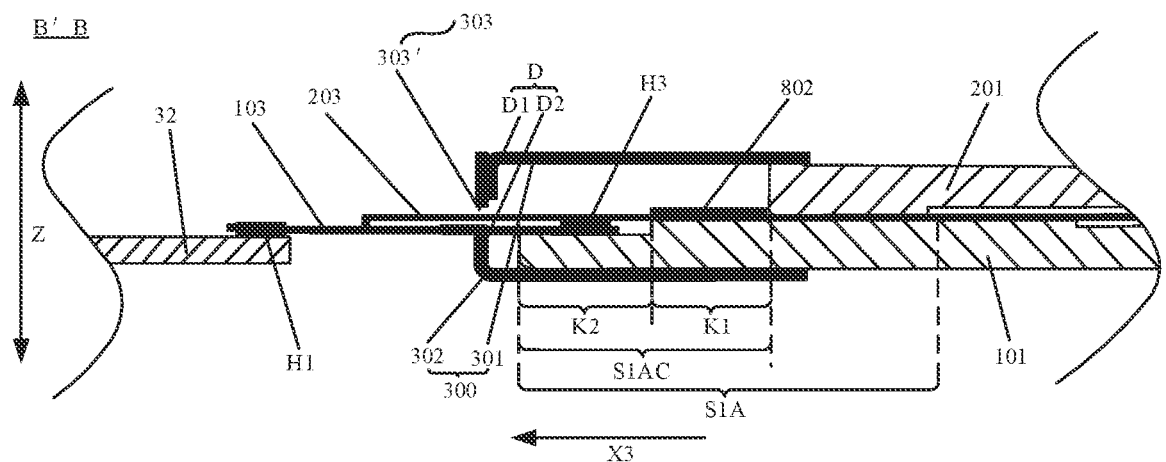
FIG. 11 is a sectional view of the double-sided display module shown in FIG. 10 taken along the section line BB'.

Based on the above structure, as shown in FIG. 11, the encapsulation housing 300 includes a side wall D facing side faces of the first display panel 101 and the second display panel 201, and the side wall D is provided with a circuit board penetration opening 303. The circuit board penetration opening 303 is configured to allow the first flexible circuit board 103 coupled to the third signal interface H3 and the second flexible circuit board 203 coupled to the fourth signal interface H4 to penetrate. The first flexible circuit board 103 is coupled to the first signal interface H1 of the signal converter board 32 after penetration, and the second flexible circuit board 203 is coupled to the second signal interface H2 of the signal converter board 32 after penetration.

Arrangements of the first flexible circuit board 103 and the second flexible circuit board 203 inside the double-sided display module 31A may be determined according to a stacked manner of the first display module 100 and the second display module 200 in the double-sided display module 31A. Several arrangements of the first flexible circuit board 103 and the second flexible circuit board 203 will be exemplarily introduced below. It can be appreciated by those skilled in the art that, the arrangements of the first flexible circuit board 103 and the second flexible circuit board 203 include, but are not limited to, the following several arrangements.

It will be noted that, in the following description, two opposite sides of the double-sided display module 31A in the first direction X1 are a first side Q1 and a second side Q2.

A first manner: the first manner is for a stacked manner of the first display module 100 and the second display module 200 as shown in FIG. 6.

As shown in FIG. 6, the first display module 100 is placed facing a paper surface (referring to (A) in FIG. 6), and the second display module 200 is placed facing away from the paper surface (referring to (B) in FIG. 6). After they are stacked, referring to (C) in FIG. 6, the first sub-region S1A of the first display panel 101 of the first display module 100 and the first sub-region S1B of the second display panel 201 of the second display module 200 are located at a same side of the double-sided display device 31A. For example, the first sub-region S1A and the first sub-region S1B are both located at the first side Q1 of the double-sided display device 31A. A second sub-region S2A of the first display panel 101 and a second sub-region S2B of the second display panel 201 are located at another side of the double-sided display device 31A. For example, both are located at the second side Q2 of the double-sided display device 31A.

Boundaries of active areas AA of the first display panel 101 and the second display panel 201 completely overlap.

Based on the above stacked manner, referring to (C) in FIG. 6, the third signal interface H3 of the first driving circuit board 102 is located at the first side Q1 of the double-sided display module 31A, and the fourth signal interface H4 of the second driving circuit board 202 is located at the first side Q1 of the double-sided display module 31A. That is, the third signal interface H3 and the fourth signal interface H4 are located at a same side of the double-sided display module 31A, and they are distributed side by side in the second direction X2.

For the above stacked manner, as shown in FIG. 7, the signal converter board 32 is disposed at the first side Q1 of the double-sided display module 31A. One end of the first flexible circuit board 103 is coupled to the third signal interface H3, and another end thereof passes through a portion of the encapsulation housing at the first side Q1 of the double-sided display module 31A, and is coupled to the first signal interface H1 of the signal converter board 32. One end of the second flexible circuit board 203 is coupled to the fourth signal interface H4, and another end thereof passes through a portion of the encapsulation housing at the first side Q1 of the double-sided display module 31A, and is coupled to the second signal interface H2 of the signal converter board 32.

In this case, two circuit board penetration openings need to be provided in the side wall of the encapsulation housing 300, so that the first flexible circuit board 103 and the second flexible circuit board 203 pass through the two circuit board penetration openings, respectively.

Figure 8:
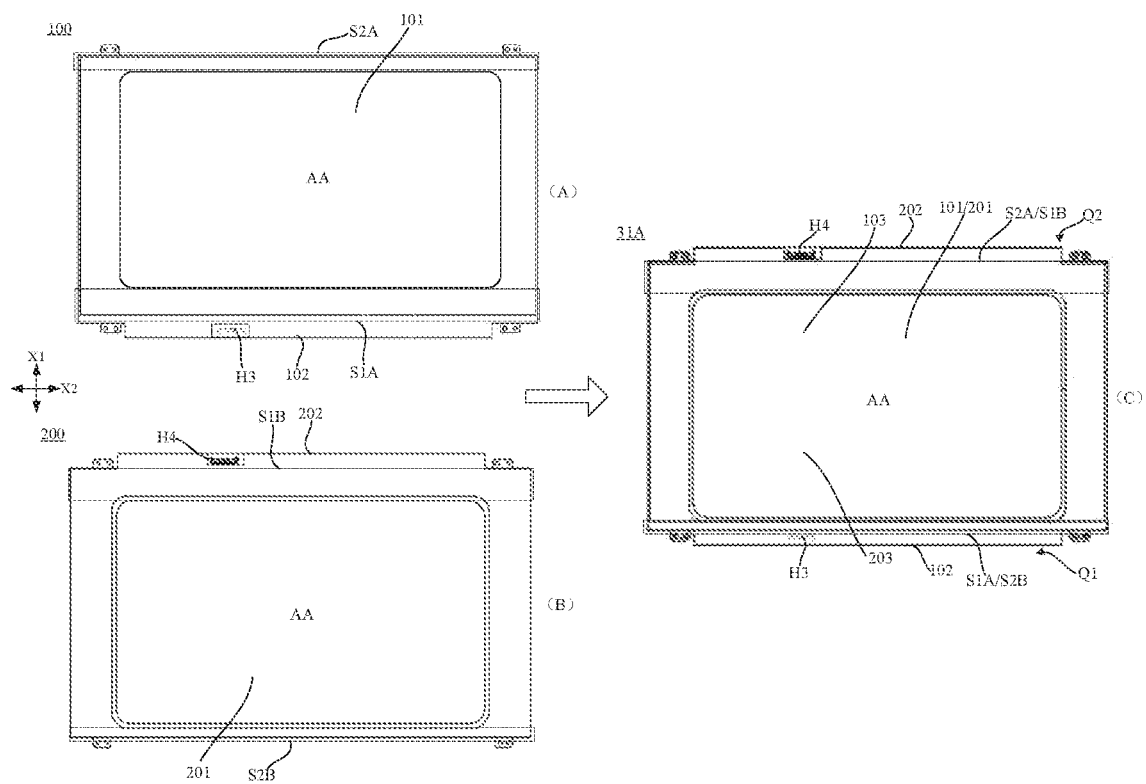
FIG. 8 is a diagram showing another structure in which a first display module and a second display module are arranged back to back, in accordance with some embodiments of the present disclosure.

A second manner: the second manner is for a stacked manner of the first display module 100 and the second display module 200 as shown in FIG. 8.

As shown in FIG. 8, the first display module 100 is placed facing the paper surface (referring to (A) in FIG. 8), the second display module 200 is placed facing away from the paper surface, and the second display module 200 is rotated by 180 degrees about a central axis perpendicular to the display surface (referring to (B) in FIG. 8). After they are stacked, referring to (C) in FIG. 8, the first sub-region S1A of the first display panel 101 and the second sub-region S2B of the second display panel 201 are located at a same side of the double-sided display device 31A. For example, the first sub-region S1A and the second sub-region S2B are both located at the first side Q1 of the double-sided display device 31A. The second sub-region S2A of the first display panel 101 and the first sub-region S1B of the second display panel 201 are located at another side of the double-sided display device 31A. For example, both are located at the second side Q2 of the double-sided display device 31A.

The boundaries of the active areas AA of the first display panel 101 and the second display panel 201 completely overlap.

Based on the above stacked manner, referring to (C) in FIG. 8, the third signal interface H3 of the first driving circuit board 102 is located at the first side Q1 of the double-sided display module 31A, and the fourth signal interface H4 of the second driving circuit board 202 is located at the second side Q2 of the double-sided display module 31A. That is, the third signal interface H3 and the fourth signal interface H4 are located at the two opposite sides of the double-sided display module 31A in the first direction X1, respectively.

Figure 9:
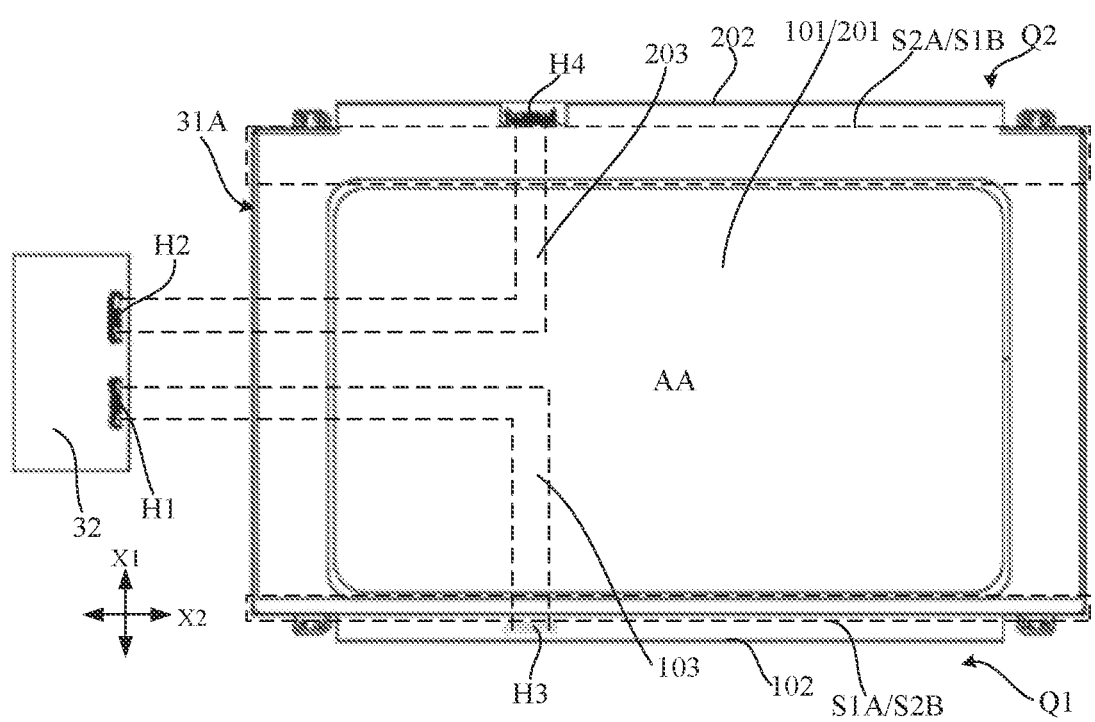
FIG. 9 is a diagram showing another structure in which a double-sided display module is connected to a signal converter board, in accordance with some embodiments of the present disclosure.

For the above stacked manner, as shown in FIG. 9, the signal converter board 32 is disposed at one of two opposite sides of the double-sided display module 31A in the second direction X2. FIG. 9 shows a case where the signal converter board 32 is disposed at a left side of the double-sided display module 31A, in which one end of the first flexible circuit board 103 is coupled to the third signal interface H3, and another end thereof passes through a portion of the encapsulation housing at the left side of the double-sided display module 31A, and is coupled to the first signal interface H1 of the signal converter board 32; and one end of the second flexible circuit board 203 is coupled to the fourth signal interface H4, and another end thereof passes through another portion of the encapsulation housing at the left side of the double-sided display module 31A, and is coupled to the second signal interface H2 of the signal converter board 32.

In this case, two circuit board penetration openings need to be provided in the side wall of the encapsulation housing 300, so that the first flexible circuit board 103 and the second flexible circuit board 203 pass through the two circuit board penetration openings, respectively. Moreover, at least one of the first flexible circuit board 103 and the second flexible circuit board 203 needs to be bent by 90 degrees in a gap between the first display panel 101 and the second display panel 201 to pass through corresponding circuit board penetration opening(s).

A third manner: the third manner is for the stacked manner of the first display module 100 and the second display module 200 as shown in FIG. 8. For the stacked manner, reference is made to the related description of the second manner and FIG. 9, and details will not be repeated herein.

For the above stacked manner, as shown in FIG. 10, the signal converter board 32 is disposed at the first side Q1 or the second side Q2 of the double-sided display module 31A. FIG. 10 shows a case where the signal converter board 32 is disposed at the first side Q1, in which one end of the first flexible circuit board 103 is coupled to the third signal interface H3, and another end thereof passes through a portion of the encapsulation housing at the first side Q1 of the double-sided display module 31A, and is coupled to the first signal interface H1 of the signal converter board 32; and one end of the second flexible circuit board 203 is coupled to the fourth signal interface H4, and another end thereof passes through the portion of the encapsulation housing at the first side Q1 of the double-sided display module 31A, and is coupled to the second signal interface H2 of the signal converter board 32.

In this case, it is possible to provide only one circuit board penetration opening 303 in the side wall of the encapsulation housing 300, and both the first flexible circuit board 103 and the second flexible circuit board 203 pass through the circuit board penetration opening 303. In this way, the number of the openings in the encapsulation housing 300 can be reduced, thereby improving a strength of the double-sided display module 31A.

In some embodiments, with continued reference to FIG. 10, the third signal interface H3 and the fourth signal interface H4 are located on a same straight line O extending in the first direction X1. The circuit board penetration opening 303 in the encapsulation housing 300 is disposed at a position on the side wall D corresponding to the third signal interface H3. After being coupled to the third signal interface H3, the first flexible circuit board 103 directly passes through the circuit board penetration opening 303. After being coupled to the fourth signal interface H4, the second flexible circuit board 203 passes through the gap between the first display panel 101 and the second display panel 201, and then passes through the circuit board penetration opening 303.

In this way, not only may both the first flexible circuit board 103 and the second flexible circuit board 203 pass through a same circuit board penetration opening 303, but also neither the first flexible circuit board 103 nor the second flexible circuit board 203 needs to be bent in the gap between the first display panel 101 and the second display panel 201.

In the above embodiments of the present disclosure, it is possible to prevent the first flexible circuit board 103 and the second flexible circuit board 203 from being bent in the gap between the first display panel 101 and the second display panel 201, thereby facilitating lightening and thinning of the double-sided display module 31A.

Figure 12:
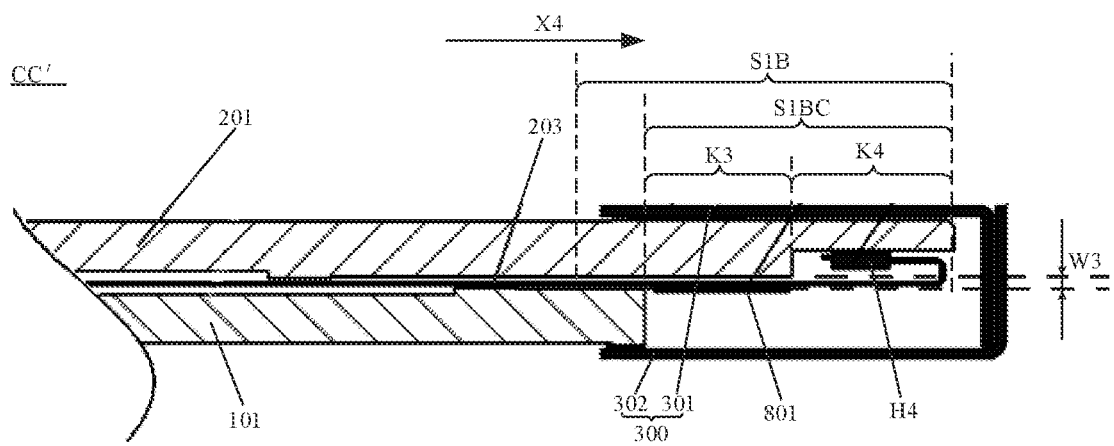
FIG. 12 is a sectional view of the double-sided display module shown in FIG. 10 taken along the section line CC'.

For example, in the above structure, the second flexible circuit board 203 passes through the gap between the first display panel 101 and the second display panel 201. As shown in FIG. 12, a minimum distance W3 between two adjacent surfaces of the first display panel 101 and the second display panel 201 in the thickness direction of the double-sided display module 31A is equal to a thickness of the second flexible circuit board 203, so that the overall thickness of the double-sided display module 31A can be reduced to a maximum extent.

For example, in the above structure, as shown in FIG. 11, an opening of the third signal interface H3 faces a direction that is away from the active area AA in the first direction X1. As shown in FIG. 12, an opening of the fourth signal interface H4 faces a direction that is away from the active area AA in the first direction X1. The third signal interface H3 and the fourth signal interface H4 are flat in a thickness direction Z of the first display panel 101 and the second display panel 201. As shown in FIGS. 10 and 12, after being electrically connected to the fourth signal interface H4 on the second display panel 201 and being reversed 180 degrees, the second flexible circuit board 203 passes through the gap between the first display panel 101 and the second display panel 201. Therefore, it is convenient for both the first flexible circuit board 103 and the second flexible circuit board 203 to reach the circuit board penetration opening 303, and operation is convenient.

As shown in FIG. 5, in some embodiments, a dimension W1 of the first sub-region S1 in the first direction X1 is greater than a dimension W2 of the second sub-region S2 in the first direction X1. For the stacked manner of the first display module 100 and the second display module 200 as shown in FIG. 8, as shown in FIG. 11, at the first side Q1 of the double-sided display module 31A, in a direction X3 that is away from the active area AA in the first direction X1, a portion S1AC, extending beyond the second display panel 201, in the first sub-region S1A of the first display panel 101 sequentially includes a first width portion K1 and a second width portion K2. A thickness of the first width portion K1 is greater than a thickness of the second width portion K2, so that a staggered space is formed at the first side Q1 of the double-sided display module 31A. The third signal interface H3 is disposed on the second width portion K2, and is located on a back face of the first display panel 101.

As shown in FIG. 12, at the second side Q2 of the double-sided display module 31A, in a direction X4 that is away from the active area AA in the first direction X1, a portion S1BC, extending beyond the first display panel 101, in the first sub-region S1B of the second display panel 201 sequentially includes a third width portion K3 and a fourth width portion K4. A thickness of the third width portion K3 is greater than a thickness of the fourth width portion K4, so that staggered spaces are formed at the second side Q2 of the double-sided display module 31A. The fourth signal interface H4 is disposed on the fourth width portion K4, and is located on a back face of the second display panel 201.

Based on this, as shown in FIGS. 11 and 12, the double-sided display module 31A further includes a first fixing member 801 and a second fixing member 802.

As shown in FIG. 12, at the second side Q2 of the double-sided display module 31A, a portion of the second flexible circuit board 203 located between following two portions, i.e., a portion of the second flexible circuit board 203 connected to the fourth signal interface and a portion of the second flexible circuit board 203 located between the first display panel 101 and the second display panel 201, is fixed on a surface, proximate to the first display panel 101, of the third width portion K3 of the second display panel 201 through the first fixing member 801. As shown in FIG. 11, a portion of the second flexible circuit board 203 located between following two portions, i.e., the portion of the second flexible circuit board 203 located between the first display panel 101 and the second display panel 201 and a portion of the second flexible circuit board 203 located at the third signal interface H3 on the first display panel 101, is fixed to a surface, proximate to the second display panel 201, of the first width portion K1 of the first display panel 101 through the second fixing member 802.

In this manner, the second flexible circuit board 203 is fixed by the first fixing member 801 and the second fixing member 802, so that the second flexible circuit board 203 cannot be loosened under action of external force.

The first fixing member 801 and the second fixing member 802 may be silica gel plates. The second flexible circuit board 203 is pressed on the surface of the third width portion K3 of the second display panel 201 and the surface of the first width portion K1 of the first display panel 101 by the silica gel plates, and then fixed by adhesion.

With continued reference to FIG. 11, in some embodiments, the circuit board penetration opening disposed in the side wall D of the encapsulation housing 300 may have the following structure.

The encapsulation housing 300 includes a first housing 301 and a second housing 302. In the thickness direction Z of the double-sided display module 31A and in a direction perpendicular to one side of the double-sided display module 31A, sections of the first housing 301 and the second housing 302 are both L-shaped. A side wall D1 of the first housing 301 and a side wall D2 of the second housing 302 overlap at the side faces of the first display panel 101 and the second display panel 201, so that the first housing 301 and the second housing 302 enclose a space with a U-shaped section. Based on this, the overlapping side wall(s) of the first housing 301 and/or the second housing 302 are each provided with a penetration sub-opening 303', and the penetration sub-opening 303' forms at least a part of the circuit board penetration opening 303. FIG. 11 shows a case where only the side wall D2 of the second housing 302 is provided with a penetration sub-opening 303'. In this case, the penetration sub-opening 303' forms the circuit board penetration opening 303.

As shown in FIG. 21, in some embodiments, in the thickness direction Z of the first display panel 101 and the second display panel 201, a first cushion pad 500 is provided between the encapsulation housing 300 and the first display panel 101 and between the encapsulation housing 300 and the second display panel 201. In this way, contacts between the encapsulation housing 300 and both the first display panel 101 and the second display panel 201 may be buffered, thereby preventing the encapsulation housing 300 from damaging the first display panel 101 and the second display panel 201.

The first cushion pad 500 may be made of a silica gel material.

With continued reference to FIG. 5, in the double-sided display module 31A, the first display module 100 and the second display module 200 may each further include a data driver circuit SD disposed in the first sub-region S1, and gate driver circuit(s) GD disposed in the third sub-region S3 and/or in the fourth sub-region. FIG. 5 shows a case where a gate driver circuit GD is disposed in the third sub-region S3.

The data driver circuit SD is coupled to the driving circuit board 102 or 202, and is used to transmit a data signal to the display panel included in the display module.

The gate driver circuit GD is coupled to the driving circuit board 102 or 202 through a wire, and is used to transmit a gate scanning signal to the display panel included in the display module.

The driving circuit board 102 or 202 may include, for example, a timing control circuit. The signal interface H3 or H4 on the driving circuit board is used for receiving the screen driving control signal from the signal converter board 32. The screen driving control signals may include, for example, an image data signal, a control signal and a dock signal, etc. The timing control circuit is used to convert the screen driving control signals into a data signal, a control signal and a clock signal suitable for the data driver circuit SD and the gate driver circuit GD, thereby driving a corresponding display panel to perform display.

In the double-sided display module 31A, the first display module 100 and the second display module 200 are fixed by using the encapsulation housing 300. Some embodiments of the present disclosure provide a solution for fixing the first display module 100, the second display module 200 and the encapsulation housing 300 by using connectors 400.

FIGS. 13 to 20 show assembly structures in which the first display module 100, the second display module 200 and the encapsulation housing 300 in the double-sided display module 31A are assembled through the connectors 400 in some embodiments of the present disclosure.

In the following description, for the structure of the first display module 100 and the structure of the second display module 200, reference may be made to FIG. 5 and the related description of FIG. 5, and details will not be repeated herein. Moreover, it will be seen from the above description that, the first display module 100 and the second display module 200 may be stacked in the two stacked manners shown in FIGS. 6 and 8. For specific structures corresponding to the two stacked manners, reference may be made to FIGS. 6 and 8 and the related descriptions of FIGS. 6 and 8, and details will not be repeated herein.

Figure 13:
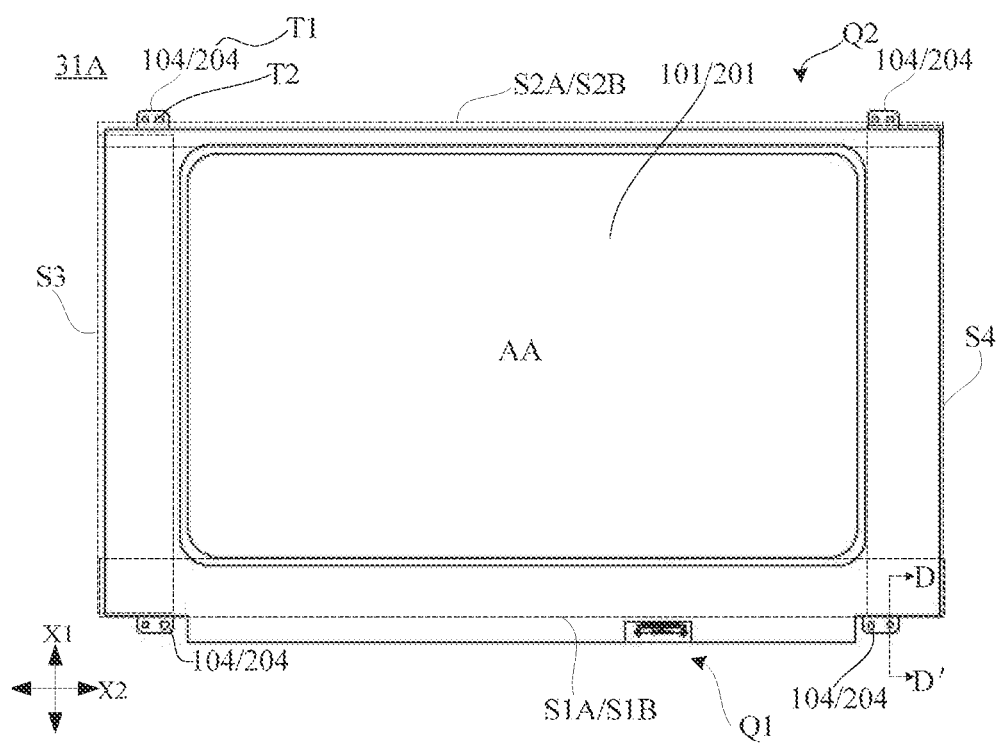
FIG. 13 is a diagram showing a structure of a double-sided display module, in accordance with some embodiments of the present disclosure.
Figure 14:
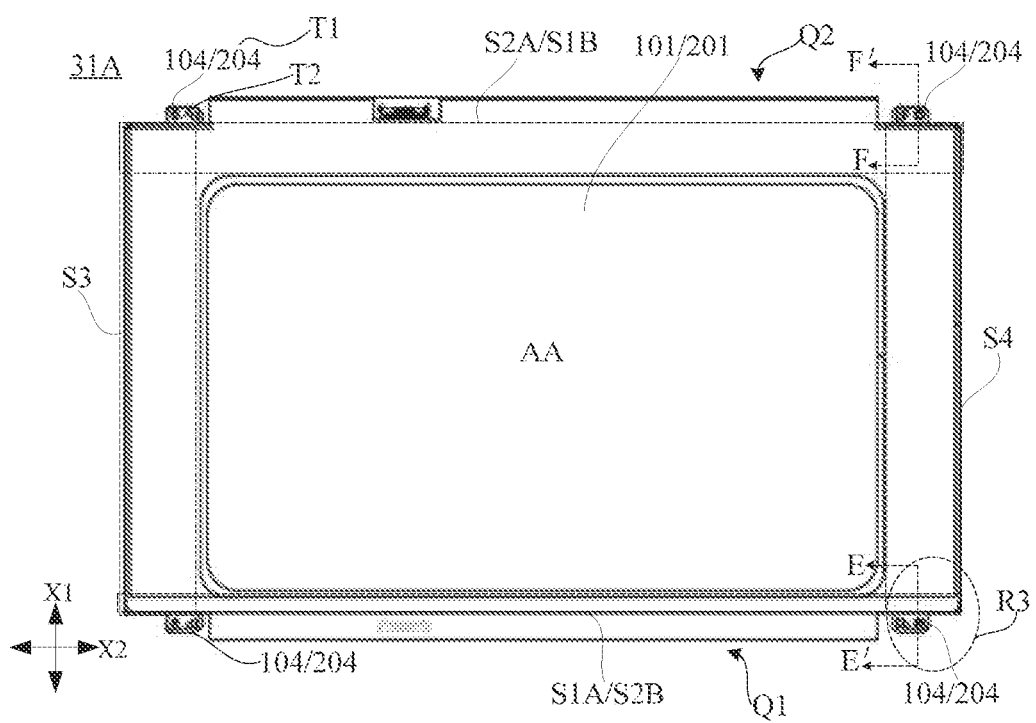
FIG. 14 is a diagram showing a structure of another double-sided display module, in accordance with some embodiments of the present disclosure.
Figure 17:
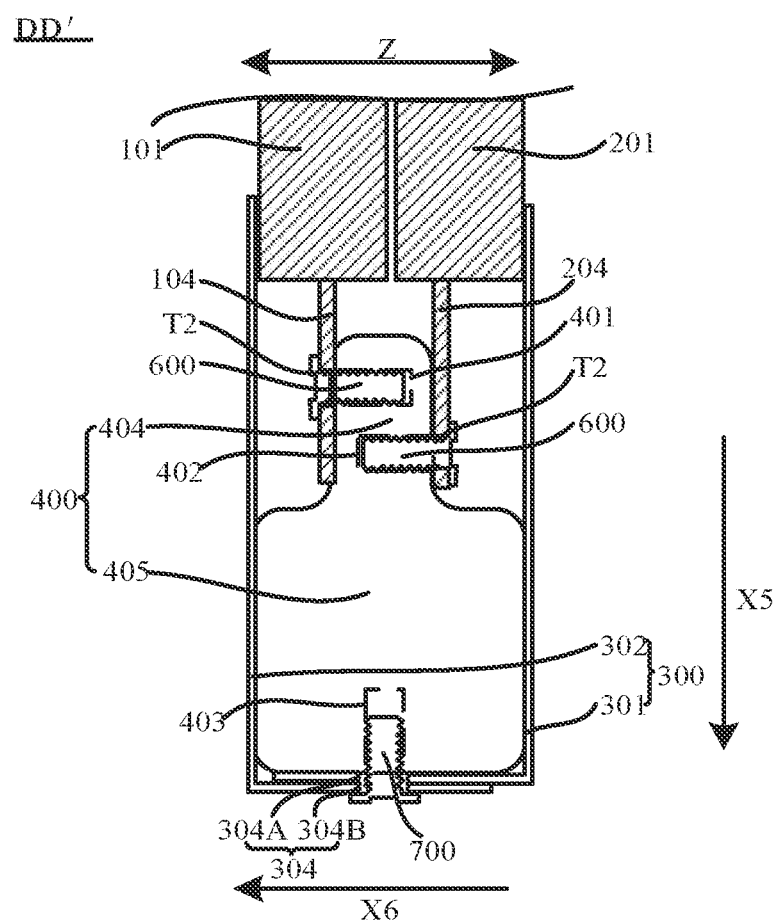
FIG. 17 is a sectional view of the double-sided display module shown in FIG. 13 taken along the section line DD'.
Figure 19:
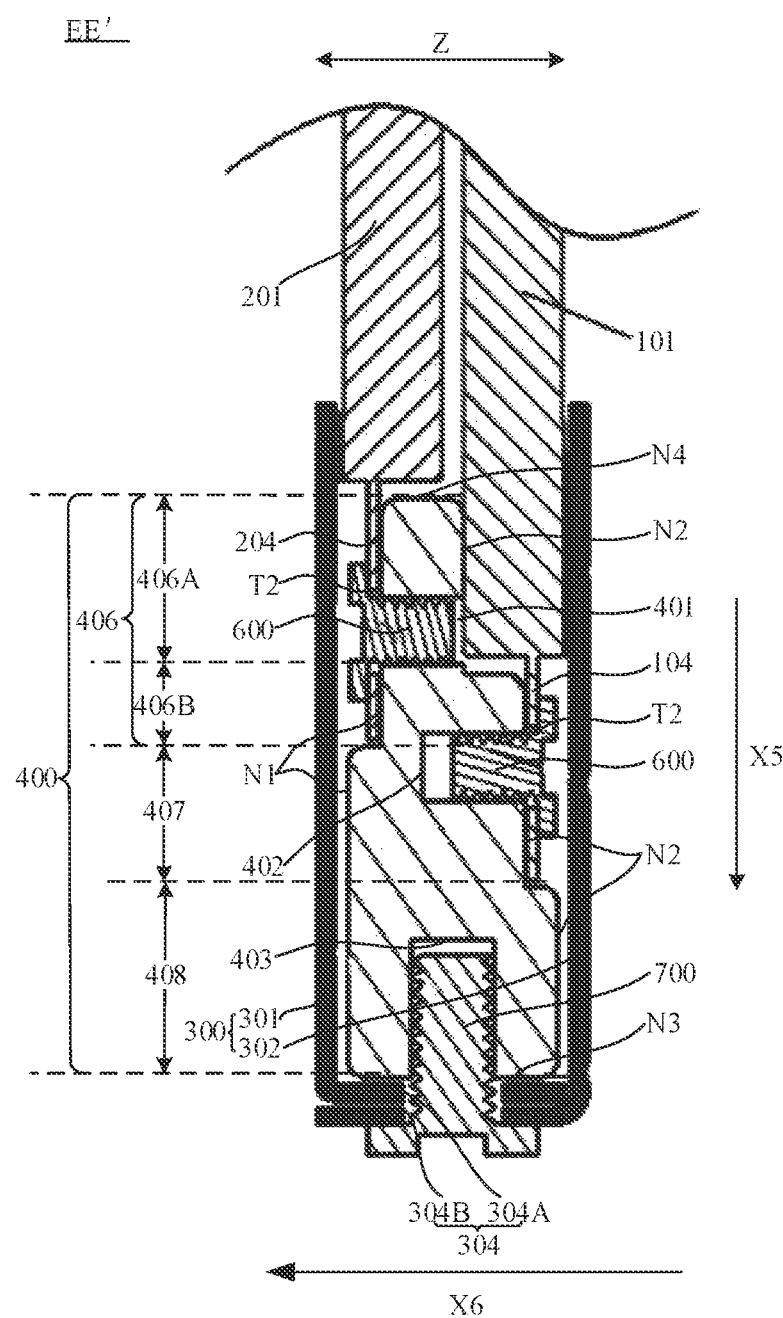
FIG. 19 is a sectional view of the double-sided display module shown in FIG. 14 taken along the section line EE'.
Figure 20:
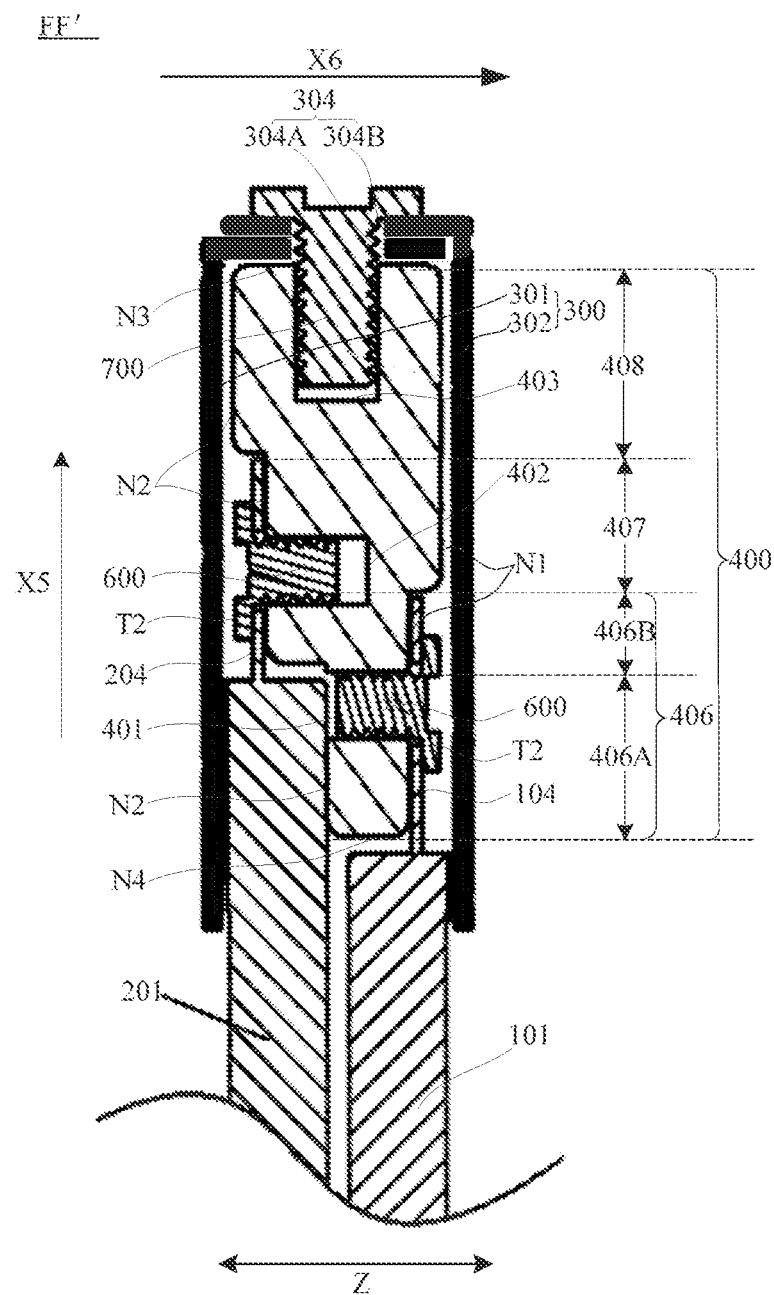
FIG. 20 is a sectional view of the double-sided display module shown in FIG. 14 taken along the section line FF'.

As shown in FIGS. 5, 13 and 14, in some embodiments of the present disclosure, the first display module 100 includes a plurality of first connection portions 104, and the second display module 200 includes a plurality of second connection portions 204. As shown in FIGS. 17, 19 and 20, side walls of the encapsulation housing 300 along the thickness direction Z of the first display panel 101 of the first display module 100 and the second display panel 201 of the second display module 200 are provided with third connection portions 304. The third connection portions 304 are in one-to-one correspondence with the first connection portions 104 and the second connection portions 204. The first display module 100, the second display module 200 and the encapsulation housing 300 are fixedly connected to the connectors 400 by the first connection portions 104, the second connection portions 204 and the third connection portions 304.

It will be noted that, if the first display module 100 and the second display module 200 are both liquid crystal display modules, and both include a frame, the first connection portions 104 and the second connection portions 204 may be respectively disposed on the frame of the first display module 100 and the frame of the second display module 200.

If the first display module 100 and the second display module 200 are each an organic light-emitting diode (OLED) display module, the OLED display module may include an OLED display panel and a housing or a frame for fixing the OLED display panel. In this way, the first connection portions 104 and the second connection portions 204 may be respectively disposed on the housing or the frame of the first display module 100 and the housing or the frame of the second display module 200.

The numbers of the first connection portions 104, the second connection portions 204, and the third connection portions 304 are not specifically limited, as long as the first display module 100, the second display module 200 and the encapsulation housing 300 can be fixedly connected through the first connection portions 104, the second connection portions, the third connection portions 304, and the connectors 400.

In some embodiments, as shown in FIGS. 5, 13, 14, 17, 19 and 20, there are a plurality of first connection portions 104, a plurality of second connection portions 204, and a plurality of third connection portions 304, and the numbers are the same. As shown in FIGS. 5, 13 and 14, the plurality of first connection portions 104 are disposed on two opposite sides of the first display panel 101 and the plurality of second connection portions 204 are disposed on two opposite sides of the second display panel 201. As shown in FIGS. 17, 19 and 20, the plurality of third connection portions 304 are disposed on sidewalls of the encapsulation housing 300 corresponding to the two opposite sides of the first display panel 101 and the second display panel 201.

With continued reference to FIGS. 5, 13 and 14, the first display module 100 and the second display module 200 may be display modules with identical structure and model. Therefore, the first connection portions 104 may be disposed on sides, away from the active area AA of the first sub-region S1A and the second sub-region S2A of the first display panel 101. In this case, the second connection portions 204 are disposed on sides, away from the active area AA, of the first sub-region S1B and the second sub-region S2B of the second display panel 201. The first connection portions 104 may also be disposed on sides, away from the active area AA, of the third sub-region S3 and the fourth sub-region S4 of the first display panel 101. In this case, the second connections portions 204 are disposed on sides, away from the active area AA, of the third sub-region S3 and the fourth sub-region S4 of the second display panel 201.

The following will be described by taking an example in which the first connection portions 104 are disposed on the sides, away from the active area AA, of the first sub-region S1A and the second sub-region S2A of the first display panel 101, and the second connection portions 204 are disposed on the sides, away from the active area AA, of the first sub-region S1B and the second sub-region S2B of the second display panel 201.

It will be noted that, since the first display module 100 and the second display module 200 are display modules with identical structure and model, positions of the first connection portions 104 and the second connection portions 204 also completely correspond to each other. For example, as shown in FIGS. 5, 13 and 14, there are four first connection portions 104 and four second connection portions 204, and the four first connection portions 104 are respectively disposed on a left side and a right side of the first sub-region S1A of the first display module 100, and a left side and a right side of the second sub-region S2A of the first display module 100; and the four second connection portions 204 are respectively disposed on the left side and the right side of the first sub-region S1B of the second display module 200, and the left side and the right side of the second sub-region S2B of the second display module 200.

For the stacked manners of the first display module 100 and the second display module 200 shown in FIGS. 6 and 13, correspondence between the first connection portions 104 of the first display panel 101 and the second connection portions 204 of the second display panel 201 may be known with reference to FIGS. 6 and 13. For example, a first connection portion 104 disposed on the left side of the first sub-region S1A of the first display panel 101 actually corresponds to a second connection portion 204 disposed on the right side of the first sub-region S1B of the second display panel 201.

For the stacked manner of the first display module 100 and the second display module 200 shown in FIGS. 8 and 14, correspondence between the first connection portions 104 of the first display panel 101 and the second connection portions 204 of the second display panel 201 may be known with reference to FIGS. 8 and 14. For example, the first connection portion 104 disposed on the left side of the first sub-region S1A of the first display panel 101 is actually arranged corresponding to a second connection portion 204 on the left side of the second sub-region S2B of the second display module 200.

Figure 16:
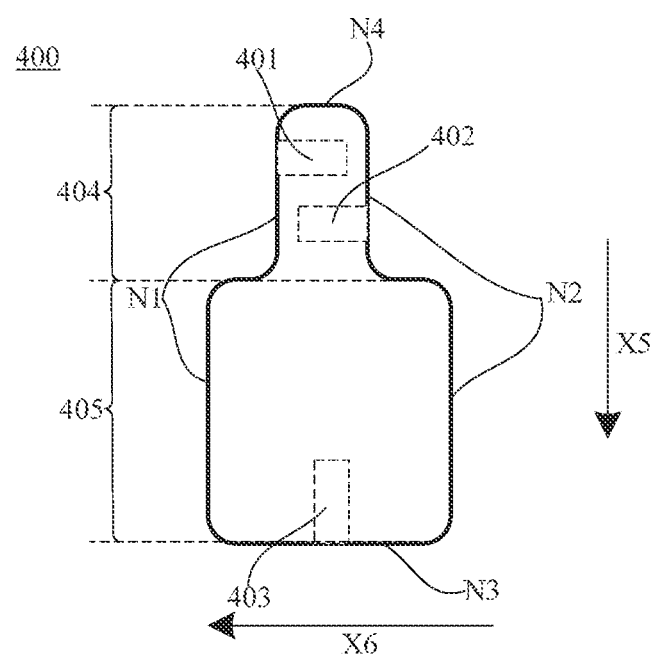
FIG. 16 is a diagram showing a structure of a connector, in accordance with some embodiments of the present disclosure.
Figure 18:
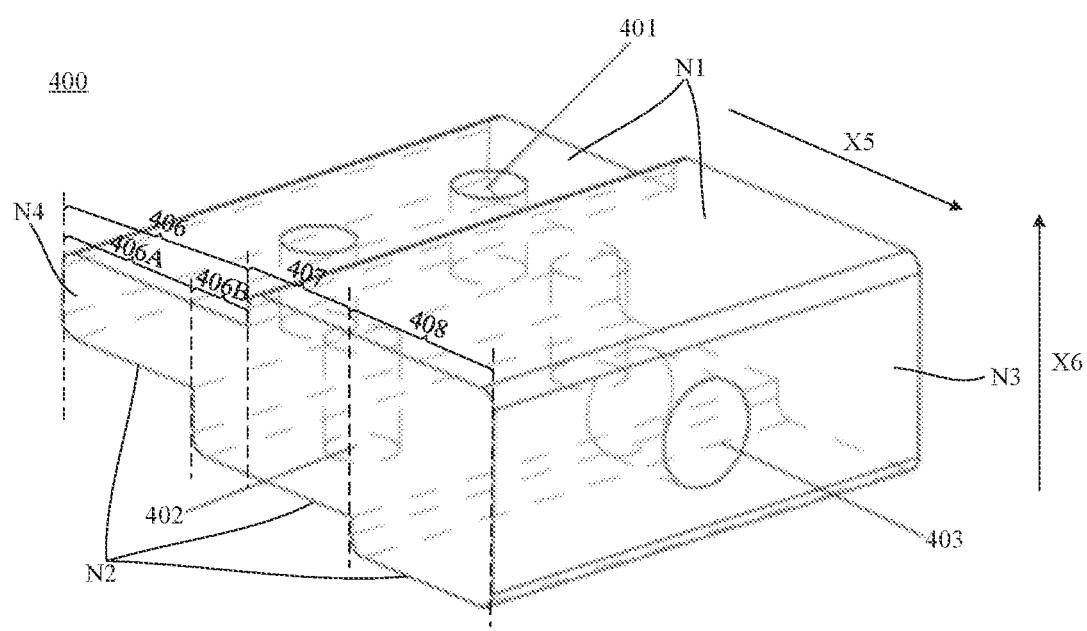
FIG. 18 is a diagram showing a structure of another connector, in accordance with some embodiments of the present disclosure.

Based on the above structure, as shown in FIGS. 16 and 18, some embodiments of the present disclosure provide a connector 400. The connector 400 has a first surface N1 and a second surface N2 that are disposed opposite to each other, and a third surface N3 and a fourth surface N4 that are both connected to the first surface N1 and the second surface N2 and are disposed opposite to each other.

The connector 400 further has at least one first connection hole 401, at least one second connection hole 402 and at least one third connection hole 403. The first connection hole 401 is disposed in the first surface N1 and extends toward the second surface N2. The second connection hole 402 is disposed in the second surface N2 and extends toward the first surface N1. The third connection hole 403 is disposed in the third surface N3 and extends toward the fourth surface N4.

In a case where the connector 400 is used to connect the first display module 100 and the second display module 200, as shown in FIGS. 17 and 20, each first connection portion 104 corresponds to first connection hole(s) 401 in a connector 400, and each second connection portion 204 corresponds to second connection hole(s) 402 in a connector 400. Alternatively, as shown in FIG. 19, each first connection portion 104 corresponds to second connection hole(s) 402 in a connector 400, and each second connection portion 204 corresponds to first connection hole(s) 401 in a connector 400.

Moreover, each third connection portion 304 corresponds to third connection hole(s) 403 in a connector 400.

Based on the above correspondences, the first connection portion 104 and the second connection portion 204 are each connected to the connector 400 through corresponding connection hole(s), and the third connection portion 304 is connected to the connector 400 through corresponding third connection hole(s) 403, so that the first display module 100 and the second display module 200 are connected together, and the first display module 100 and the second display module 200 are fixed by the encapsulation housing 300.

In the embodiments of the present disclosure, the double-sided display module 31A includes a plurality of connectors 400, and the plurality of connectors 400 may be distributed around the first display panel 101 and the second display panel 201, thereby connecting the first display panel 101 and the second display panels 201 together from all around, and ensuring a strength of the connection between the first display panel 101 and the second display panel 201.

Moreover, using the connector 400 provided by the embodiments of the present disclosure may improve a degree of integration of the two display modules and the encapsulation housing 300, thereby improving a connection strength.

In addition, compared with a case where the two display panels are each installed with a housing first, and then the two housings are installed, which needs to align the two display panels, in an assembly process of the double-sided display module 31A in the embodiments of the present disclosure, alignment of the two display panels is not required, which can simplify operation processes.

In some embodiments, with continued reference to FIGS. 16 and 18, a vertical distance from an axis of the second connection hole 402 to the fourth surface N4 is greater than a vertical distance from an axis of the first connection hole 401 to the fourth surface N4.

In some embodiments, with continued reference to FIGS. 16 and 18, in a direction X5 pointing from the fourth surface N4 to the third surface N3, a thickness of the connector 400 increases stepwise. The thickness of the connector 400 refers to a dimension of the connector 400 in a direction X6 pointing from the second surface N2 to the first surface N1.

The expression "increase stepwise" means that the thickness of the connector 400 is uneven in the direction X5 pointing from the fourth surface N4 to the third surface N3, the connector 400 has a plurality of thickness portions, and in the direction X5 pointing from the fourth surface N4 to the third surface N3, thicknesses of the plurality of thickness portions are increased stepwise.

Based on this, by connecting the first connection portion 104 and the second connection portion 204 to thinner portions of the connector 400, respectively, and by making a thicker portion of the connector 400 abut against the encapsulation housing 300, the double-sided display module 31A and the encapsulation housing 300 can be position-limited and fixed. In this way, the connection strength can be improved, and an alignment structure is not intentionally formed, which simplify the entire display module. In addition, complicated assembly position-limiting features are concentrated on the surrounding connectors 400, which greatly reduces material and processing costs.

In the embodiments of the present disclosure, specific structures of the first connection portion 104 of the first display module 100, the second connection portion 204 of the second display module 200, and the third connection portion 304 of the encapsulation housing 300 are not limited, as long as they can be correspondingly connected to the first connection hole 401, the second connection hole 402, and the third connection hole 403 of the connector 400.

For example, the first connection portion 104, the second connection portion 204, and the third connection portion 304 may each include a connection piece and a protrusion structure disposed on the connection piece. In this way, the first connection portion 104, the second connection portion 204 and the third connection portion 304 may be cooperatively connected to the first connection hole 401, the second connection hole 402 and the third connection hole 403 through the protrusion structures, respectively.

For example, as shown in FIGS. 13, 14, 17, 19 and 20, the first connection portion 104 and the second connection portion 204 are each a connection piece T1. The connection piece T1 is provided with at least one through hole T2, and an extending direction of an axis of the through hole T2 is consistent with the thickness direction Z of the first display panel 101 and the second display panel 201.

As shown in FIGS. 17, 19 and 20, the third connection portion 304 is a through hole disposed in the side wall of the encapsulation housing 300, and an axis of the through hole is perpendicular to the side wall of the encapsulation housing 300 where it is located. For example, in a case where the encapsulation housing 300 includes the first housing 301 and the second housing 302, the overlapping side walls of the first housing 301 and the second housing 302 are provided with a sub-through hole 304A and a sub-through hole 304B, respectively and the two sub-through holes 304A and 304B at corresponding positions overlap to form a third connection portion 304.

As shown in FIGS. 17, 19 and 20, each first connection portion 104 and each second connection portion 204 are each connected to a corresponding connection hole of first connection hole(s) 401 and second connection hole(s) 402 of a connector 400 through a first screw 600; and the third connection portion 304 is correspondingly connected to a third connection hole 403 in the connector 400 through a second screw 700.

Based on this, during the assembly, a first screw 600 is inserted into a through hole T2 in the first connection portion 104 and a corresponding connection hole (the first connection hole 401 or the second connection hole 402); a first screw 600 is inserted into a through hole T2 in the second connection portion 204 and a corresponding connection hole (the second connection hole 402 or the first connection hole 401); and the second screw 700 is inserted into the third connection portion 304 in the side wall of the encapsulation housing 300 and the third connection hole 403. In this way, connection between the connector 400 and all the first connection portion 104, the second connection portion 204 and the third connection portion 304 may be achieved.

Based on the above basic structure of the connector 400, specific structures of the connector 400 applicable to the two stacked manners of the first display module 100 and the second display module 200 shown in FIGS. 13 and 14 will be described with respect to the two stacked manners below. It will be appreciated by those skilled in the art that, the specific structures of the connector 400 include, but are not limited to, the following two structures.

In some embodiments, for the stacked manner of the first display module 100 and the second display module 200 shown in FIG. 13, a first connection portion 104 and a second connection portion 204 corresponding to each other of the first display module 100 and the second display module 200 overlap, and thus the first display module 100 and the second display module 200 may be connected by using connectors 400 shown in FIG. 16.

As shown in FIG. 16, the connector 400 includes a fourth connection portion 404 and a fifth connection portion 405 that are sequentially arranged in the direction X5 pointing from the fourth surface N4 to the third surface N3. The fourth connection portion 404 and the fifth connection portion 405 may be of an integral structure, a side face of the fourth connection portion 404 away from the fifth connection portion 405 is the fourth surface N4, and a side face of the fifth connection portion 405 away from the fourth connection portion 404 is the third surface N3.

A thickness of the fifth connection portion 405 is greater than a thickness of the fourth connection portion 404. A portion of the first surface N1 corresponding to the fourth connection portion 404 is retracted toward the second surface N2 relative to a portion of the first surface N1 corresponding to the fifth connection portion 405; and a portion of the second surface N2 corresponding to the fourth connection portion 404 is retracted toward the first surface N1 relative to a portion of the second surface N2 corresponding to the fifth connection portion 405.

The first connection hole 401 and the second connection hole 402 are both disposed in the fourth connection portion 404.

Based on this, as shown in FIG. 17, the fourth connection portion 404 in the connector 400 is located between the first connection portion 104 and the second connection portion 204. In the thickness direction Z of the first display panel 101 and the second display panel 201, the first connection portion 104 and the second connection portion 204 do not overlap with the fifth connection portion 405, and the first display panel 101 and the second display panel 201 do not overlap with the fourth connection portion 404. In this way, each first connection portion 104 is correspondingly connected to a fourth connection portion 404 through a first connection hole 401 in a connector 400, each second connection portion 204 is correspondingly connected to a fourth connection portion 404 through a second connection hole 402 in a connector 400, and each third connection portion 304 is correspondingly connected to a fifth connection portion 405 through a third connection hole 403 in a connector 400.

In the above structure, the thickness of the entire double-sided display device 31A depends on a stacked thickness of the first display panel 101 and the second display panel 201. The thickness of the fifth connection portion 405 may be reasonably set. For example, the thickness of the fifth connection portion 405 may be made equal to the stacked thickness of the first display panel 101 and the second display panel 201. In addition, side faces of the fifth connection portion 405 corresponding to the first surface N1 and the second surface N2 are both in contact with the encapsulation housing 300, so that fixing and position-limiting effects can be achieved after installation is accomplished, thereby improving the strength of the connection between the connector 400 and the first display module 100, the second display module 200, and the encapsulation housing 300.

Since the first connection portion 104 and the second connection portion 204 extend beyond the first display panel 101 and the second display panel 201, by arranging the fourth connection portion 404 between the first connection portion 104 and the second connection portion 204, it is further possible to avoid a problem that the stacked thickness of the first display panel 101 and the second display panel 201 is increased due to the arrangement of the fourth connection portion 404 between the two display panels.

It will be noted that, since the first connection hole 401 and the second connection hole 402 are disposed in the fourth connection portion 404, in a case where the first connection portion 104 and the second connection portion 204 are each the connection piece T1 and the connection piece T1 has the through hole T2, according to a positional relationship between the through hole in the first connection portion 104 and the through hole in the second connection portion 204, in the direction X6 pointing from the second surface N2 to the first surface N1, the first connection hole 401 and the second connection hole 402 may overlap with each other (applicable to a case where the through hole in the first connection portion 104 and the through hole in the second connection portion 204 are opposite each other), or may not overlap (applicable to a case where the through hole in the first connection portion 104 and the through hole in the second connection portion 204 are not opposite each other).

In a case where the first connection hole 401 and the second connection hole 402 do not overlap, in the direction X5 pointing from the fourth surface N4 to the third surface N3, the distance from the axis of the first connection hole 401 to the fourth surface N4 may or may not be equal to the distance from the axis of the second connection hole 402 to the fourth surface N4, which is not specifically limited herein. FIG. 16 shows a case where in the direction X5 pointing from the fourth surface N4 to the third surface N3, the vertical distance from the axis of the second connection hole 402 to the fourth surface N4 is greater than the vertical distance from the axis of the first connection hole 41 to the fourth surface N4.

For example, thicknesses of portions in the first sub-regions S1 of the first display panel 101 and the second display panel 201 are greater than thicknesses of portions in the second sub-regions S2 thereof. As shown in FIG. 13, the first sub-region S1A of the first display panel 101 and the first sub-region S1B of the second display panel 201 are located at the first side Q1 of the double-sided display device 31A, and the second sub-region S2A of the first display panel 101 and the second sub-region S2B of the second display panel 201 are located at the second side Q2 of the double-sided display device 31A.

Based on the above structure, in the case where the first connection portion 104 and the second connection portion 204 are each the connection piece T1, and the connection piece T1 has the through hole T2, a distance between a first connection portion 104 and a second connection portion 204 that are arranged corresponding to each other in any group at the first side Q1 is greater than a distance between a first connection portion 104 and a second connection portion 204 that are arranged corresponding to each other in any group at the second side Q2.

In this case, in order to keep a uniform overall thickness of the first display panel 101 and the second display panel 201 after they are stacked, a thickness of a fourth connection portion 404 in a connector 400 at the first side Q1 may be made smaller than a thickness of a fourth connection portion 404 in a connector 400 at the second side Q2.

Figure 15:
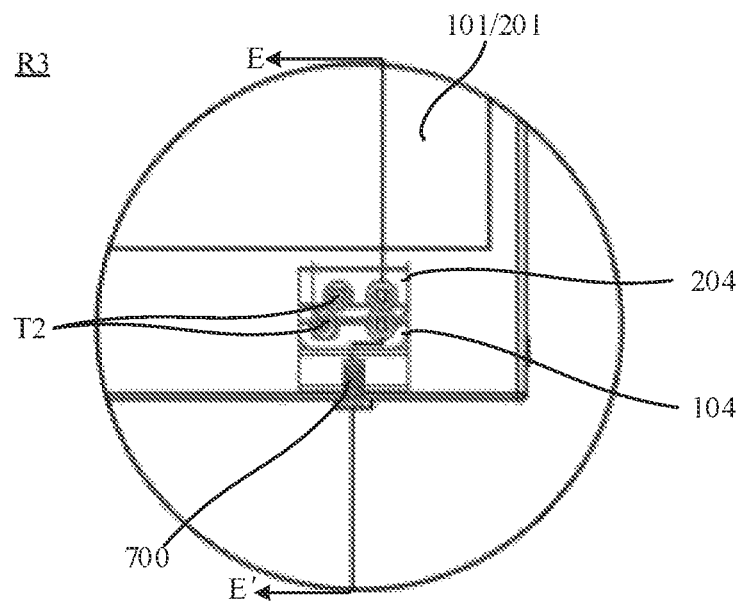
FIG. 15 is a partial enlarged view of the region R3 in FIG. 14.

In some other embodiments, for the stacked manner of the first display module 100 and the second display module 200 as shown in FIG. 14, in a case where widths of the first sub-regions S1 of the display panels are greater than widths of the second sub-regions S2 thereof, as shown in FIG. 15, a first connection portion 104 and a second connection portion 204 corresponding to each other of the first display panel 101 and the second display module 200 partially overlap. That is, they do not completely overlap. In other words, there is a deviation in their positions. The first display module 100 and the second display module 200 may be connected by using the connector 400 shown in FIG. 18.

As shown in FIG. 18, the connector 400 includes a sixth connection portion 406, a seventh connection portion 407, and an eighth connection portion 408 that are sequentially arranged in the direction X5 pointing from the fourth surface N4 to the third surface N3. The sixth connection portion 406, the seventh connection portion 407, and the eighth connection portion 408 are of an integral structure. A side face of the sixth connection portion 406 away from the eighth connection portion 408 is the fourth surface N4, and a side face of the eighth connection portion 408 away from the sixth connection portion 406 is the third surface N3.

A thickness of the eighth connection portion 408 is greater than a thickness of the seventh connection portion 407, and the thickness of the seventh connection portion 407 is greater than thickness(es) of the sixth connection portion 406. A portion of the first surface N1 corresponding to the seventh connection portion 407 is flush with a portion of the first surface N1 corresponding to the eighth connection portion 408. A portion of the second surface N2 corresponding to the seventh connection portion 407 is retracted toward the first surface N1 relative to a portion of the second surface N2 corresponding to the eighth connection portion 408. A portion of the first surface N1 corresponding to the sixth connection portion 406 is retracted toward the second surface N2 relative to the portion of the first surface N1 corresponding to the seventh connection portion 407. A portion of the second surface N2 corresponding to the sixth connection portion 406 is retracted toward the first surface N1 relative to the portion of the second surface N2 corresponding to the eighth connection portion 408.

The first connection hole(s) 401 are disposed in the sixth connection portion 406, and the second connection hole(s) 402 are disposed in the seventh connection portion 407.

Based on this, as shown in FIGS. 14 and 19, at the first side Q1 of the double-sided display module 31A, since the first sub-region S1A of the first display panel 101 extends beyond the second sub-region S2B of the second display panel 201, each first connection portion 104 is correspondingly connected to a seventh connection portion 407 through second connection hole(s) 402 in a connector 400, each second connection portion 204 is correspondingly connected to a sixth connection portion 406 through first connection hole(s) 401 in a connector 400, and each third connection portion 304 is correspondingly connected to an eighth connection portion 408 through third connection hole(s) 403 in a connector 400.

As shown in FIGS. 14 and 20, at the second side Q2 of the double-sided display module 31A, since the first sub-region S1B of the second display panel 201 extends beyond the second sub-region S2A of the first display panel 101, each first connection portion 104 is correspondingly connected to a sixth connection portion 406 through first connection hole(s) 401 in a connector 400, each second connection portion 204 is correspondingly connected to a seventh connection portion 407 through second connection hole(s) 402 in a connector 400, and each third connection portion 304 is correspondingly connected to an eighth connection portion 408 through third connection hole(s) 403 in a connector 400.

For the first display panel 101 and the second display panel 201 shown in FIG. 14, there is a deviation in the positions of the first connection portion 104 and the second connection portion 204 corresponding to each other, and there is a problem that the first display module 100, the second display module 200 and the encapsulation housing 300 cannot be connected by using a same connector (e.g., a screw or a bolt). In the embodiments of the present disclosure, by using the connector 400 shown in FIG. 18, a first connection portion 104 and a second connection portion 204 corresponding to each other but with a deviation in positions in any group may be connected through a connector 400, thereby achieving the integrated installation of the two display modules and the encapsulation housing 300, and simplifying the structure of the double-sided display module 31A.

For example, in the case where the first connection portion 104 and the second connection portion 204 are each the connection piece T1, and the connection piece T1 has the through hole(s) T2, as shown in FIG. 19, at the first side Q1 of the double-sided display module 31A, the first connection portion 104 faces the seventh connection portion 407, and the second connection portion 204 faces the sixth connection portion 406; and as shown in FIG. 20, at the second side Q2 of the double-sided display module 31A, the first connection portion 104 faces the sixth connection portion 406, and the second connection portion 204 faces the seventh connection portion 407.

That is, as shown in FIG. 19, that at the first side Q1 of the double-sided display module 31A, the first connection portion 104 faces the seventh connection portion 407 and the second connection portion 204 faces the sixth connection portion 406 means that the first connection portion 104 extends to a side of the seventh connection portion 407 corresponding to the second surface N2 and does not extend beyond the seventh connection portion 407; and the second connection portion 204 extends to a side of the sixth connection portion 406 corresponding to the first surface N1 and does not extend beyond the sixth connection portion 406.

As shown in FIG. 20, that at the second side Q2 of the double-sided display module 31A, the first connection portion 104 faces the sixth connection portion 406, and the second connection portion 204 faces the seventh connection portion 407 means that the second connection portion 204 extends to a side of the seventh connection portion 407 corresponding to the second surface N2 and does not extend beyond the seventh connection portion 407; and the first connection portion 104 extends to a side of the sixth connection portion 406 corresponding to the first surface N1 and does not extend beyond the sixth connection portion 406.

Therefore, the first connection portion 104 and the second connection portion 204 are staggered in the thickness direction Z of the first display module 100 and the second display module 200, and the strength of the connection between each connector 400 and the first display module 100, the second display module 200 and the encapsulation housing 300 may be improved.

For example, the thicknesses of portions in the first sub-regions S1 of the first display panel 101 and the second display panel 201 are greater than the thicknesses of portions in the second sub-regions S2 thereof. As shown in FIG. 14, the first sub-region S1A of the first display panel 101 and the second sub-region S2B of the second display panel 201 are located at the first side Q1 of the double-sided display device 31A, and the second sub-region S2A of the first display panel 101 and the first sub-region S1B of the second display panel 201 are located at the second side Q2 of the double-sided display device 31A.

Based on the above structure, in the case where the first connection portion 104 and the second connection portion 204 are each the connection piece T1, and the connection piece T1 has the through hole(s) T2, a distance between a first connection portion 104 and a second connection portion 204 that are corresponding to each other in any group at the first side Q1 is equal to a distance between a first connection portion 104 and a second connection portion 204 that are corresponding to each other in any group at the second side Q2.

In this case, in order to keep the overall thickness of the first display panel 101 and the second display panel 201 after they are stacked uniform, thicknesses of a sixth connection portion 406 and a seventh connection portion 407 in a connector 400 at the first side Q1 may be made respectively equal to thicknesses of a sixth connection portion 406 and a seventh connection portion 407 in a connector 400 at the second side Q2.

Based on this, shapes, structures and sizes of connectors 400 used at the first side Q1 and the second side Q2 of the double-sided display module 31A may be identical.

For example, as shown in FIG. 18, the sixth connection portion 406 of the connector 400 includes a first sub-portion 406A and a second sub-portion 406B that are sequentially arranged along the direction X5 pointing from the fourth surface N4 to the third surface N3, and the first sub-portion 406A and the second sub-portion 406B are of an integral structure.

A thickness of the second sub-portion 406B is greater than a thickness of the first sub-portion 406A. A portion of the first surface N1 corresponding to the first sub-portion 406A is flush with a portion of the first surface N1 corresponding to the second sub-portion 406B. A portion of the second surface N2 corresponding to the first sub-portion 406A is retracted toward the first surface N1 relative to a portion of the second surface N2 corresponding to the second sub-portion 406B. The portion of the second surface N2 corresponding to the second sub-portion 406B is flush with the portion of the second surface N2 corresponding to the seventh connection portion 407.

Based on this, as shown in FIG. 19, at the first side Q1 of the double-sided display module 31A, the portion, extending beyond the second display panel 201, in the first sub-region S1A of the first display panel 101 is located in a space defined by a side of the first sub-portion 406A away from the second connection portion 204 and a side of the second sub-portion 406B away from the seventh connection portion 407. As shown in FIG. 20, at the second side Q2 of the double-sided display module 31A, the portion, extending beyond the first display panel 101, in the first sub-region S1B of the second display panel 201 is located in a space defined by a side of the first sub-portion 406A away from the first connection portion 104 and a side of the second sub-portion 406B away from the seventh connection portion 407.

That is, for the above solution in which the sixth connection portion 406 includes the first sub-portion 406A and the second sub-portion 406B with different thicknesses, as shown in FIG. 19, at the first side Q1 of the double-sided display module 31A, the first sub-portion 406A is located between the portion, extending beyond the second display panel 201, in the first sub-region S1A of the first display panel 101 and the second connection portion 204. As shown in FIG. 20, at the second side Q2 of the double-sided display module 31A, the first sub-portion 406A is located between the portion, extending beyond the first display panel 101, in the first sub-region S1B of the second display panel 201 and the first connection portion 104.

Through the above arrangement, a size of a front face of the double-sided display module 31A may be reduced, thereby reducing an area occupied by the double-sided display module 31A.

In addition, as shown in FIGS. 19 and 20, by providing the first sub-portion 406A and the second sub-portion 406B, at the first side Q1 of the double-sided display module 31A, the second connection portion 204 may extend to sides of the first sub-portion 406A and the second sub-portion 406B corresponding to the first surface N1, and the portion, extending beyond the second display panel 201, in the first sub-region S1 of the first display panel 101 extends to a side of the first sub-portion 406A corresponding to the second surface N2; and at the second side Q2 of the double-sided display module 31A, the first connection portion 104 may extend to the sides of the first sub-portion 406A and the second sub-portion 406B corresponding to the first surface N1, and the portion, extending beyond the first display panel 101, of the first sub-portion S1 of the second display panel 201 extends to the side of the first sub-portion 406A corresponding to the second surface N2.

In this way, the strength of the connection between each connector 400 and the first display module 100, the second display module 200 and the encapsulation housing 300 can be further improved.

It will be noted that, in practical applications, according to different sequences in which the first connection portion 104 and the second connection portion 204 are installed, a through hole T2 in a first connection portion 104 and a through hole T2 in a second connection portion 204 that are assembled first are easily aligned with a small tolerance, and a through hole T2 in a first connection portion 104 and a through hole T2 in a second connection portion 204 that are assembled last are aligned with increased difficulty. Therefore, in some examples, sizes of a through hole T2 in a first connection portion 104 and a through hole T2 in a second connection portion 204 that are assembled later may be made greater than sizes of a through hole T2 in a first connection portion 104 and a through hole T2 in a second connection portion 204 that are installed earlier, so as to facilitate the assembly.

For example, as shown in FIG. 14, for the plurality of first connection portions 104, a size of a through hole T2 in at least one first connection portion 104 is different from sizes of through holes T2 in remaining first connection portions 104. For the plurality of second connection portions 204, a size of a through hole T2 in at least one second connection portion 204 is different from sizes of through holes T2 in remaining second connection portions 204.

In this way, for first connection portions 104 and second connection portions 204 that are corresponding to each other in a plurality of groups, sizes of a first connection portion 104 and a second connection portion 204 that are corresponding to each other in one group may be smaller than sizes of first connection portions 104 and second connection portions 204 that are corresponding to each other in remaining groups.

It will be noted that, an application range of the connector 400 provided by the embodiments of the present disclosure is not limited to the double-sided display module, and the connector 400 may be used in any situation where two objects need to be assembled and connected.

A specific structure of the encapsulation housing 300 is not limited in the embodiments of the present disclosure, and the encapsulation housing 300 may be of an integrally formed structure, or may be assembled from two housings.

In some embodiments, as shown in FIGS. 17, 19 and 20, the encapsulation housing 300 includes the first housing 301 and the second housing 302. In the thickness direction Z of the double-sided display module 31A and in the direction perpendicular to one side of the double-sided display module 31A, the sections of the first housing 301 and the second housing 302 are both L-shaped. The side wall of the first housing 301 and the side wall of the second housing 302 overlap at the side faces of the first display panel 101 and the second display panel 201, so that the first housing 301 and the second housing 302 enclose the space with the U-shaped section.

Based on this, during the assembly, the first display panel 101 and the second display panel 201 may be assembled with the connectors 400 first, then the first display panel 101, the second display panel 201 and the connectors 400 are placed into the first housing 301 and the second housing 302 together, and then the first housing 301, the second housing 302 and the connectors 400 are assembled through the first screws 600 and the second screws 700. The operation process is simple and convenient, and the installation may be achieved without alignment.

In some embodiments, as shown in FIG. 21, for the display assembly 1, the display assembly 1 further includes second cushion pads 40 disposed between the first clamping plate 10 and the encapsulation housing 300, and between the second clamping plate 20 and the encapsulation housing 300. In this way, the second cushion pads 40 may buffer a position where the first clamping plate 10 is in contact with the encapsulation housing 300 and a position where the second clamping plate 20 is in contact with the encapsulation housing 300, thereby preventing the first clamping plate 10 and the second clamping plate 20 from being damaged.

For example, a material of the second cushion pads 40 may be an elastic material such as silica gel or rubber. Further, the material of the second cushion pads 40 may also be a material with an anti-slip effect. In this way, the second cushion pads 40 may also play an anti-slip role, thereby avoiding displacement of the display module between the first clamping plate 10 and the second clamping plate 20.

In the double-sided display module 31A provided by the embodiments of the present disclosure, the first display module 100 and the second display module 200 may be display modules capable of separately performing display.

For example, the first display module 100 and the second display module 200 may both be liquid crystal display modules or OLED display modules, or one of them is a liquid crystal display module, and the other is an OLED display module.

FIGS. 22 to 27 show some possible structures of the first display module 100 and the second display module 200.

Figure 22:
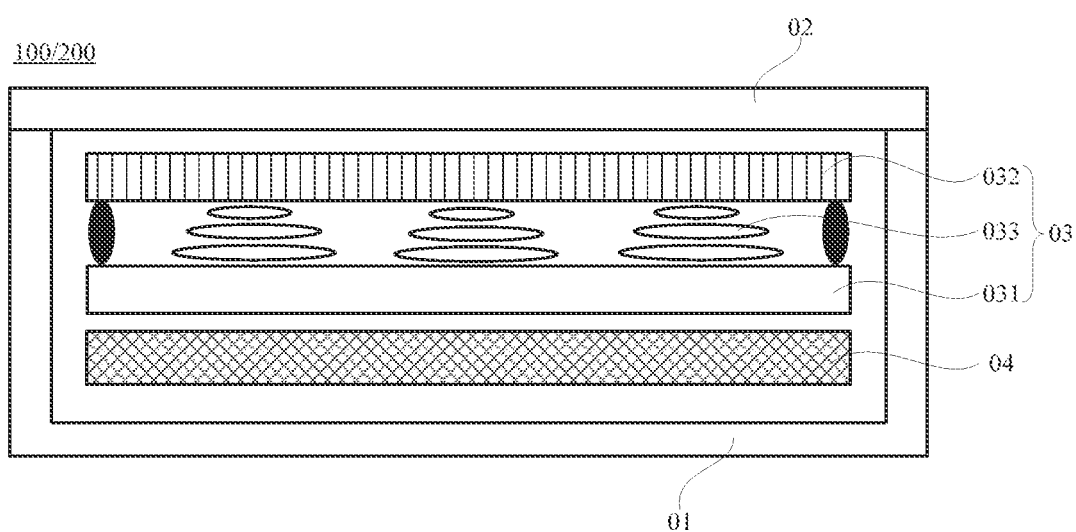
FIG. 22 is a sectional view of a first display module and a second display module, in accordance with some embodiments of the present disclosure.

In an example in which the first display module 100 and the second display module 200 are both liquid crystal display modules, as shown in FIG. 22, the first display module 100 and the second display module 200 may each include a frame 01, a cover glass 02, a liquid crystal display panel 03, a backlight module 04, other electronic components, etc.

A longitudinal section of the frame 01 is, for example, U-shaped. Other electronic components such as the liquid crystal display panel 03, the backlight module 04 and the like are disposed in the frame 01. The backlight module 04 is disposed below the liquid crystal display panel 03, and the cover glass 02 is located at a side of the liquid crystal display panel 03 away from the backlight module 04.

With continued reference to FIG. 22, the liquid crystal display panel 03 includes an array substrate 031, an opposite substrate 032, and a liquid crystal layer 033 disposed between the array substrate 031 and the opposite substrate 032. The array substrate 031 and the opposite substrate 032 are assembled together through a sealant, so that the liquid crystal layer 033 is confined in a region enclosed by the sealant.

Figure 23:
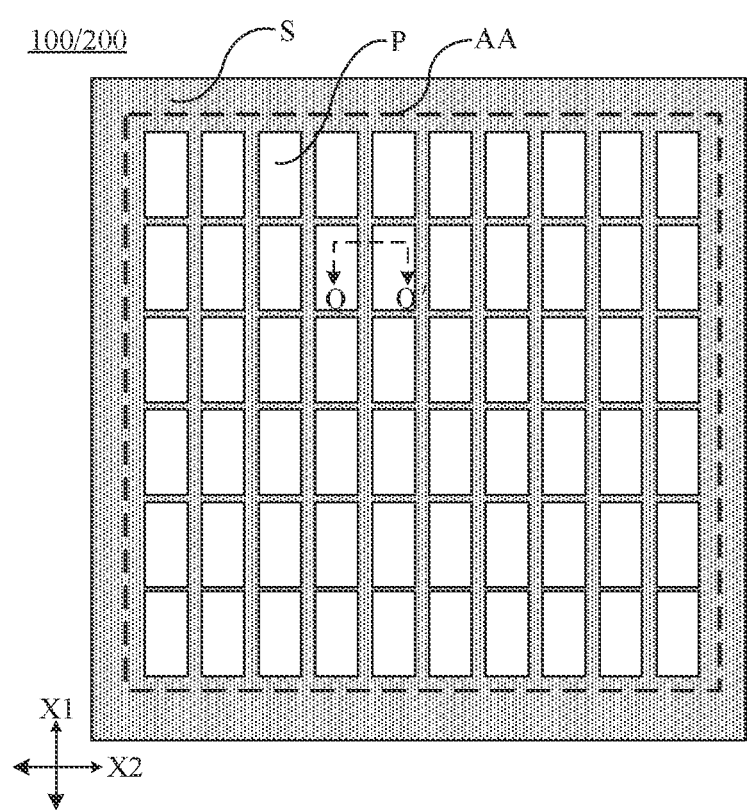
FIG. 23 is a top view of a first display module and a second display module, in accordance with some embodiments of the present disclosure.

As shown in FIG. 23, the first display module 100 and the second display module 200 each include an active area AA and a peripheral area 5, and the active area AA is provided with a plurality of sub-pixels P therein. The peripheral area S is used for wiring, and a gate driver circuit may be provided in the peripheral area S.

Herein, as shown in FIG. 23, a description will be given by taking an example in which the plurality of sub-pixels P are arranged in a matrix. In this case, sub-pixels P arranged in a line in the horizontal direction X2 are referred to as sub-pixels in a same row, and sub-pixels P arranged in a line in the vertical direction X1 are referred to as sub-pixels in a same column. The sub-pixels P in the same row may be connected to a gate line, and the sub-pixels P in the same column may be connected to a data line.

Figure 24:
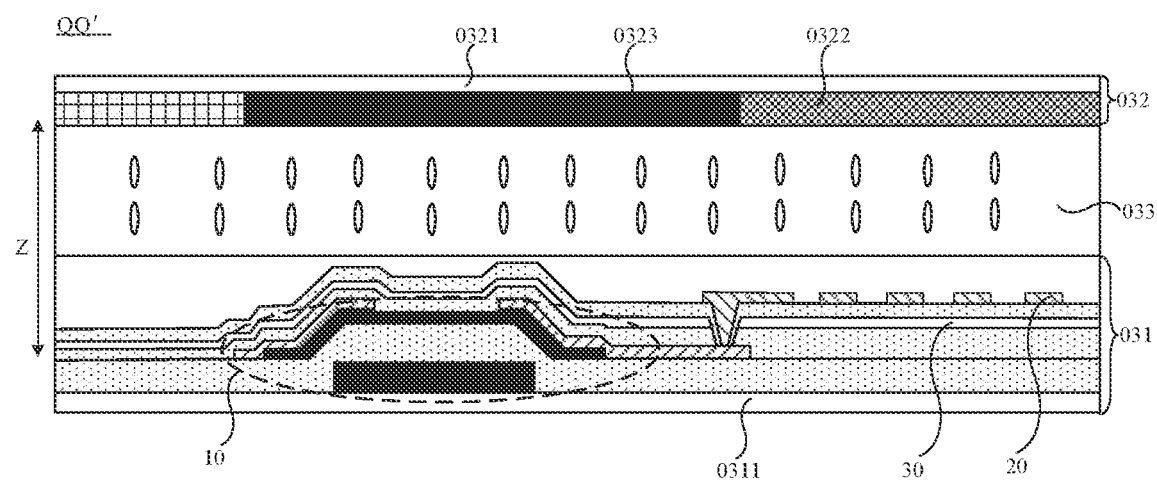
FIG. 24 is a sectional view of the first display module and the second display module shown in FIG. 23 taken along the section line QQ'.

As shown in FIG. 24, the array substrate 031 is provided with a thin film transistor 10 and a pixel electrode 20 that are located in a region where each sub-pixel P is located on a first base 0311. The thin film transistor 10 includes an active layer, a source electrode, a drain electrode, a gate electrode and a gate insulator (abbreviated as GI). The source electrode and the drain electrode are in contact with the active layer, and the pixel electrode 20 is electrically connected to the drain electrode of the thin film transistor 10.

In some embodiments, the array substrate 031 further includes common electrode(s) 30 disposed on the first base 0311. The pixel electrodes 20 and the common electrodes 30 may be disposed in a same layer. In this case, the pixel electrode 20 and the common electrode 30 are each a comb-tooth structure including a plurality of strip-shaped sub-electrodes.

As shown in FIG. 24, the pixel electrodes 20 and the common electrode 30 may be disposed in different layers.

It will be noted that, the liquid crystal display panel 03 is described with the common electrode 30 being disposed in the array substrate 031, but the present disclosure is not limited thereto. The common electrode 30 may be arranged in the opposite substrate 032, and the details will not be repeated herein.

The array substrate 031 further includes gate lines and data lines. The gate electrode of the thin film transistor 10 is electrically connected to a gate line, and the source electrode thereof is electrically connected to a data line. The thin film transistor 10 in the array substrate 031 is used to control whether to apply a signal to the pixel electrode 20. When a signal is input to the gate line, the thin film transistor 10 connected to the gate line is turned on, so that a signal in the data line is applied to the pixel electrode 20 through the turned-on thin film transistor 10.

As shown in FIG. 24, the opposite substrate 032 includes color filter layers 0322 disposed on a side of a second base 0321 facing the liquid crystal layer 033. A color filter layer 0322 corresponding to red sub-pixels is a red filter layer; a color filter layer 0322 corresponding to green sub-pixels is a green filter layer; and a color filter layer 0322 corresponding to blue sub-pixels is a blue filter layer. The color filter layer 0322 corresponding to the red sub-pixels refers to portions of the color filter layer 0322 facing the red sub-pixels in the thickness direction Z of the liquid crystal display panel 03. The color filter layer 0322 corresponding to the green sub-pixels refers to portions of the color filter layer 0322 facing the green sub-pixels in the thickness direction Z of the liquid crystal display panel 03. The color filter layer 0322 corresponding to the blue sub-pixels refers to portions of the color filter layer 0322 facing the blue sub-pixels in the thickness direction Z of the liquid crystal display panel 03.

Regardless of whether it is the red filter layer, the green filter layer or the blue filter layer, its material includes a material formed by mixing a polymer material and an organic dye, which is referred to as an organic dye material. A difference in the materials of the red filter layer, the green filter layer and the blue filter layer lies in a difference in organic dyes.

In addition, in order to avoid crosstalk between adjacent sub-pixels, the opposite substrate 032 further includes a black matrix (BM) 0323. The black matrix 0323 includes a plurality of first light-shielding strips that are parallel and a plurality of second light-shielding strips that are parallel. The plurality of first light-shielding strips and the plurality of second light-shielding strips enclose a plurality of meshes, and each mesh is a region where one sub-pixel is located.

Figure 25:
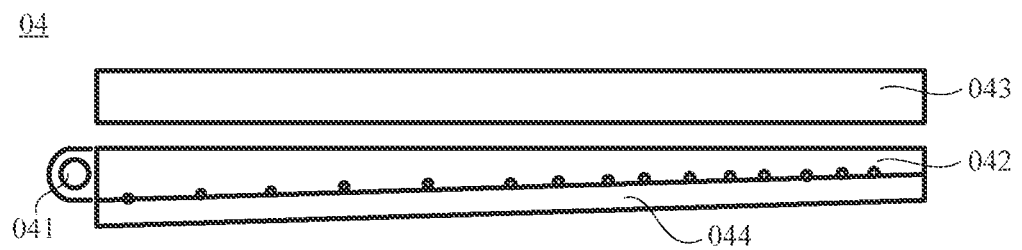
FIG. 25 is a sectional view of a backlight module, in accordance with some embodiments of the present disclosure.
Figure 26:
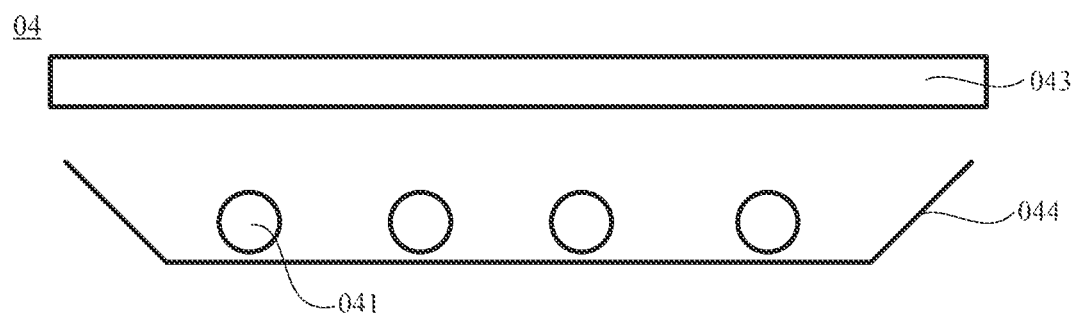
FIG. 26 is a sectional view of another backlight module, in accordance with some embodiments of the present disclosure.

As shown in FIGS. 25 and 26, the backlight module 04 includes a light source 041, a light guide plate 042, and optical film(s) 043 disposed on a light-exiting side of the light guide plate 042.

The optical film(s) 043 may include a diffusion sheet and/or a brightness enhancement film (BEF). The brightness enhancement film may be a prism film, a dual brightness enhancement film (DBEF), or a combination thereof.

As shown in FIG. 25, the light source 041 may be disposed on a side face of the light guide plate 042. In this case, the backlight module 04 is an edge-lit backlight module. Based on this, as shown in FIG. 25, the backlight module 04 may further include a reflective sheet 044, and the reflective sheet 044 is disposed on a side of the light guide plate 042 away from the light-exiting side.

A cross-section of the light guide plate 042 has two shapes, i.e., a wedge shape and a flat plate shape. FIG. 25 shows an example in which the light guide plate 042 is a wedge-shaped plate.

As shown in FIG. 26, the light source 041 may also be disposed on a side of the light guide plate 042 away from the light-exiting side. In this case, the backlight module 04 is a direct-lit backlight module. The light source 041 may include, for example, light-emitting diodes (LED).

In a case where the backlight module 04 is the direct-lit backlight module, a light plate may be made by using micro blue LEDs arranged in an array. The light plate is disposed at a bottom of the backlight module 04, and a light-exiting direction of the light plate faces the liquid crystal display panel 03.

For example, as shown in FIG. 26, a direct-lit backlight module is provided, in which the blue LEDs are made into the light plate as the light source 041, the optical film(s) 043 is disposed above the light plate, and the reflective sheet 044 may be disposed below the light source 041.

The structures of the backlight module 04 in FIGS. 25 and 26 are merely examples, and the structure of the backlight module 04 may further have other variations, which are not limited herein.

In some embodiments, in a case where the first display module 100 and the second display module 200 are both the liquid crystal display modules, one of the first display module 100 and the second display module 200 includes a backlight module 04, the other does not include a backlight module 04. The backlight module 04 is disposed between the first display panel 101 and the second display panel 201, and the backlight module 04 is configured to provide light to the first display panel 101 and the second display panel 201. That is, the backlight module 04 is a backlight module capable of emitting light on both sides. As a result, the first display module 100 and the second display module 200 may share one backlight module 04, and the double-sided display module 31A is made light and thin.

In some other embodiments of the present disclosure, the double-sided display module may include a double-sided display panel. In this case, the double-sided display panel may be a double-sided light-emission OLED display panel.

Figure 27:
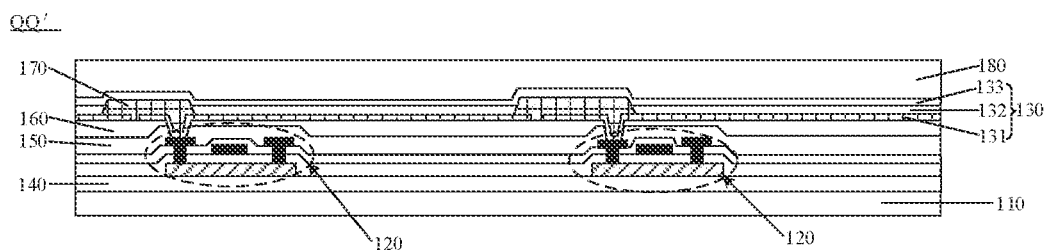
FIG. 27 is another sectional view of the first display module and the second display module shown in FIG. 23 taken along the section line QQ', in accordance with some embodiments of the present disclosure.

As shown in FIG. 27, the display panel includes a base 110 and a pixel driving circuit disposed in each sub-pixel P on the base 110 and electrically connected to a light-emitting device in the sub-pixel P. The pixel driving circuit includes a plurality of thin film transistors 120. The plurality of thin film transistors include a driving thin film transistor. A drain electrode of the driving thin film transistor is electrically connected to an anode 131 of a light-emitting device 130.

A buffer layer 140 may be provided between the first base 110 and the thin film transistor 120.

In addition to the anode 131, the light-emitting device 130 may further include a light-emitting functional layer 132 and a cathode 133. In a case where the light-emitting device 130 is a double-sided light-emission light-emitting device, the anode 131 and the cathode 133 are both transparent. In this case, the anode may be made of indium tin oxide (ITO), and the cathode 133 may be made of metallic silver with a thinner thickness.

In some embodiments, the light-emitting functional layer 132 includes a light-emitting layer. In some other embodiments, in addition to the light-emitting layer, the light-emitting functional layer 132 further includes one or more of an election transporting layer (abbreviated as ETL), an election injection layer (abbreviated as EIL), a hole transporting layer (abbreviated as HTL) and a hole injection layer (abbreviated as HIL).

On the above basis, for example, with continued reference to FIG. 27, the display panel may further include a passivation layer 150 and a planarization layer 160 disposed between the driving transistor and the anode 131. A material of the passivation layer 150 is an inorganic material, and a material of the planarization layer 160 is an organic material.

In addition, for example, as shown in FIG. 27, the display panel may further include a pixel defining layer 170 located in a region where the sub-pixels P are located. The pixel defining layer 170 includes a plurality of opening regions, and a light-emitting functional layer 132 of one light-emitting device 130 is disposed in one opening region.

The display panel 2111 may further include an encapsulation layer 180, and the encapsulation layer 180 may be an encapsulation film or an encapsulation glass.

It can be seen from the above description that, the display assembly 1 of the baffle member 1011 is installed inside the carriage body 1022 of the vehicle body 1020 through the at least one adapter 2. A structure of the adapter 2 will be exemplarily introduced below.

Figure 28:
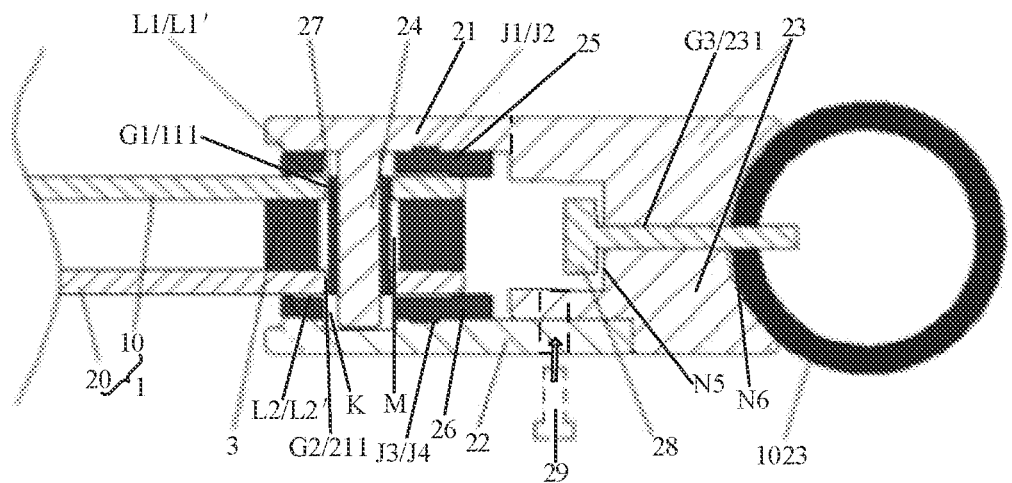
FIG. 28 is a diagram showing a structure in which a baffle member is installed through connectors, in accordance with some embodiments of the present disclosure.
Figure 29:
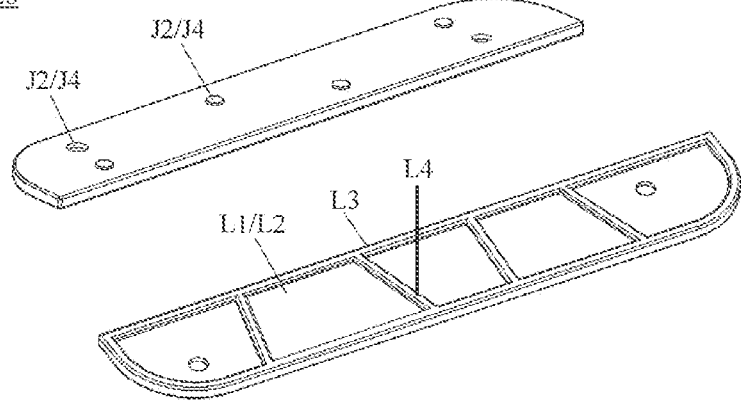
FIG. 29 is a diagram showing structures of a third cushion pad and a fourth cushion pad on two opposite sides, in accordance with some embodiments of the present disclosure.

FIGS. 28 and 29 show the structure of the adapter 2 in some embodiments of the present disclosure.

As shown in FIGS. 1, 4 and 28, at least one adapter 2 is provided on the periphery of the display assembly 1, and the adapter 2 is connected to an adapter portion 111 in the first clamping plate 10 and an adapter portion 211 in the second clamping plate 20 of the display assembly 1, so that the display assembly 1 is fixed to the object in the external environment, for example, fixed to the carriage body 1022 or the armrest 1023.

As shown in FIG. 28, the adapter 2 includes: a first adapter plate 21 and a second adapter plate 22 that are arranged oppositely and separately, a fixing block 23 connected to the first adapter plate 21 and the second adapter plate 22, and a fixing pin 24 disposed between the first adapter plate 21 and the second adapter plate 22.

The fixing pin 24 is connected to one of the first adapter plate 21 and the second adapter plate 22. FIG. 28 shows a case where the fixing pin 24 is connected to the first adapter plate 21.

The adapter portion 111 in the first clamping plate 10 is a first through hole G1, the adapter portion 211 in the second clamping plate 20 is a second through hole G2, and the fixing pin 24 passes through the first through hole G1 and the second through hole G2, so that an edge of the display assembly 1 is caught between the first adapter plate 21 and the second adapter plate 22.

The fixing block 23 in the adapter 2 includes a fixing portion 231, and the adapter 2 is fixed to the object in the external environment through the fixing portion 231. FIG. 28 shows a case where the adapter 2 is fixed to the armrest 1023 in the vehicle body 1020 through the fixing portion 231.

A structure of the fixing portion 231 may be reasonably set according to a position of the baffle member 1011 in the vehicle body 1020 and the structural feature of the vehicle body 1020 and/or structural features of components in the vehicle body 1020.

In some embodiments, as shown in FIG. 28, the fixing block 23 includes a fifth surface N5 and a sixth surface N6 that are arranged oppositely. The fifth surface N5 is closer to the fixing pin 24 than the sixth surface N6, and the fixing portion 231 is a third through hole G3 penetrating the fifth surface N5 and the sixth surface N6. The adapter 2 may be fixed to the object in the external environment by using a fourth fixing member 28 to pass through the third through hole G3. The fourth fixing member 28 may be, for example, a screw.

In some embodiments, as shown in FIG. 28, a surface, proximate to the fixing pin 24, of one of the first adapter plate 21 and the second adapter plate 22 that is not connected to the fixing pin 24 is provided with a groove K matched with the fixing pin 24, so that the fixing pin 24 may be position-limited, thereby preventing the display assembly 1 from slipping off the fixing pin 24. For example, as shown in FIG. 28, the fixing pin 24 is connected to the first adapter plate 21, and a surface of the second adapter plate 22 proximate to the fixing pin 24 is provided with a groove K matched with the fixing pin 24.

In some embodiments, as shown in FIG. 28, the first adapter plate 21 and the fixing block 23 are connected into an integral structure, and the second adapter plate 22 and the fixing block 23 are detachably connected. Alternatively, the second adapter plate 22 and the fixing block 23 are connected into an integral structure, and the first adapter plate 21 and the fixing block 23 are detachably connected. FIG. 28 shows a case where the first adapter plate 21 and the fixing block 23 are connected into an integral structure, and the second adapter plate 22 and the fixing block 23 are detachably connected.

Based on the above structure, when the display assembly 1 is installed by using the adapter 2, the adapter 2 is first fixed to the carriage body 1022 or the armrest 1023. For example, the fixing block 23 may be fixed to the carriage body 1022 or the armrest 1023 by using the fourth fixing member 28 to pass through the third through hole G3 from a side away from the carriage body 1022 or the armrest 1023. Then, the first adapter plate 21 is connected to the fixing block 23. In a case where the first adapter plate 21 and the fixing block 23 are of an integral structure, this step is not needed. Then, the fixing pin 24 connected to the first transfer plate 21 is inserted into the first through hole G1 of the first clamping plate 10 and the second through hole G2 of the second clamping plate 20 of the display assembly 1 (in this step, it is taken as an example that the fixing pin 24 is connected to the first transfer plate 21). Finally, the second adapter plate 22 is connected to the fixing block 23. For example, the connection between the second adapter plate 22 and the fixing block 23 may be achieved by using a fifth fixing member 29 to penetrate through holes, matched with each other, provided in the second adapter plate 22 and the fixing block 23. The fifth fixing member 29 may be, for example, a screw.

It can be seen that, by using the adapter 2, the first adapter plate 21 and the second adapter plate 22 do not need to be aligned, and the installation is convenient. In addition, when the display assembly 1 needs to be replaced or repaired, the second adapter plate 22 may be directly disassembled to replace or repair the display assembly 1, which is simple and convenient to operate.

In some embodiments, the fixing block 23 in the adapter 2 may further be provided with a wiring hole for allowing the connection line (e.g., the connection line 1013 shown in FIGS. 1 and 4) to penetrate. In this way, when the display device 30 in the display assembly is electrically connected to an external electrical appliance (e.g., the controller 1012 shown in FIGS. 1 and 4), the connection line may be arranged in the wiring hole, thereby preventing the connection line being exposed.

In some embodiments, as shown in FIGS. 28 and 29, the adapter 2 further includes a third cushion pad 25 disposed on a surface of the first adapter plate 21 proximate to the second adapter plate 22, and a fourth cushion pad 26 disposed on a surface of the second adapter plate 22 proximate to the first adapter plate 21. The third cushion pad 25 and the fourth cushion pad 26 are both arranged around the fixing pin 24. In this way, in the edge portion of the display assembly 1 caught between the first adapter plate 21 and the second adapter plate 22, surfaces of the display assembly 1 in the thickness direction Z are in contact with the third cushion pad 25 and the fourth cushion pad 26, respectively.

In the above embodiments, by providing the third cushion pad 25 on the surface of the first adapter plate 21 proximate to the second adapter plate 22, and by providing the fourth cushion pad 26 on the surface of the second adapter plate 22 proximate to the first adapter plate 21, it is possible to prevent the first adapter plate 21 and the second adapter plate 22 from directly contacting the first clamping plate 10 and the second clamping plate 20 of the baffle member 1011, thereby improving reliability of the tempered glass in a case where the first clamping plate 10 and the second clamping plate 20 are the tempered glass.

In some embodiments, as shown in FIGS. 28 and 29, a surface of the first adapter plate 21 proximate to the third cushion pad 25 is provided with first position-limiting portion(s) J1, and a surface of the third cushion pad 25 proximate to the first adapter plate 21 is provided with second position-limiting portion(s) J2 in matching connection with the first position-limiting portion(s) J1. And/or, a surface of the second adapter plate 22 proximate to the fourth cushion pad 26 is provided with third position-limiting portion(s) J3, and a surface of the fourth cushion pad 26 proximate to the second adapter plate 22 is provided with fourth position-limiting portion(s) J4 in matching connection with the third position-limiting portion J3.

The first position-limiting portion J1 may be a position-limiting groove. In this case, the second position-limiting portion J2 may be a position-limiting protrusion. Alternatively, the first position-limiting portion J1 may be a position-limiting protrusion. In this case, the second position-limiting portion J1 may be a position-limiting groove.

The third position-limiting portion J3 may be a position-limiting groove. In this case, the fourth position-limiting portion J4 may be a position-limiting protrusion. Alternatively, the third position-limiting portion J3 may be a position-limiting protrusion. In this case, the fourth position-limiting portion J4 may be a position-limiting groove.

For example, the first adapter plate 21 may include a plurality of first position-limiting portions J1, and the third cushion pad 25 may include a plurality of second position-limiting portions J2. In this case, part of the plurality of first position-limiting portions J1 are position-limiting grooves, and the other part of the plurality of first position-limiting portions J1 are position-limiting protrusions. Alternatively, all the plurality of first position-limiting portions J1 are position-limiting grooves or position-limiting protrusions. The plurality of second position-limiting portions J2 are designed to be matched with the plurality of first position-limiting portions J1.

For example, the second adapter plate 22 may include a plurality of third position-limiting portions J3, and the fourth cushion pad 26 may include a plurality of fourth position-limiting portions J4. In this case, part of the plurality of third position-limiting portions J3 are position-limiting grooves, and the other part of the plurality of third position-limiting portions J3 are position-limiting protrusions. Alternatively, all the plurality of third position-limiting portions J3 are position-limiting grooves or position-limiting protrusions. The plurality of fourth position-limiting portions J4 are designed to be matched with the plurality of third position-limiting portions J3.

In the above embodiments, by providing the position-limiting portions that are matched with each other on the adapter plates and the cushion pads, the third cushion pad 25 and/or the fourth cushion pad 26 may be further position-limited, thereby preventing the third cushion pad 25 and/or the fourth cushion pad 26 from slipping.

In some embodiments, as shown in FIG. 28, a surface of the third cushion pad 25 away from the first adapter plate 21 is provided with a first recess L1, so that a surface, in contact with the third cushion pad 25, of the edge portion of the display assembly 1 forms a first damping chamber L1' with the first recess L1. And/or, a surface of the fourth cushion pad 26 away from the second adapter plate 22 is provided with a second recess L2, so that a surface, in contact with the fourth cushion pad 26, of the edge portion of the display assembly 1 forms a second damping chamber L2' with the second recess L2.

In the above embodiments, by providing the first recess L1 in the third cushion pad 25 and/or the second recess L2 in the fourth cushion pad 26, and thus forming the first damping chamber L1' and/or the second damping chamber L2', the stress may be buffered, so that the reliability of the first clamping plate 10 and the second clamping plate 20 that are made of glass may be improved.

The first recess L1 and the second recess L2 may be regular-shaped grooves, such as circular grooves, or may be irregular-shaped grooves.

In an embodiment of the present disclosure, as shown in FIG. 29, the first recess L1 is enclosed by edge ribs L3 located at an edge of the third cushion pad 25 and ribs L4 located between the edge ribs L3. The second recess L2 is enclosed by edge ribs L3 located at an edge of the fourth cushion pad 26 and ribs L4 located between the edge ribs L3.

In some embodiments, as shown in FIG. 28, the adapter 2 further includes a fifth cushion pad 27 disposed between the fixing pin 24 and inner walls of the first through hole G1 and the second through hole G2. The fifth cushion pad 27 may prevent the first clamping plate 10 and the second clamping plate 20 from directly contacting the fixing pin 24, buffer stress between both the first clamping plate 10 and the second clamping plate 20 and the fixing pin 24, and prevent the stress from damaging the first clamping plate 10 and the second clamping plate 20.

In some embodiments, as shown in FIG. 28, a sixth cushion pad 3 is provided between positions on edges of the first clamping plate 10 and the second clamping plate 20. The sixth cushion pad 3 has an opening M at a position corresponding to the first through hole G1 and the second through hole G2 for the fixing pin 24 to pass through the sixth cushion pad 3. The sixth cushion pad 3 can support a gap between the first clamping plate 10 and the second clamping plate 20, and may buffer stress on the first clamping plate 10 and the second clamping plate 20.

During the assembly of the display assembly 1, an adhesive may be coated on both side faces of the sixth cushion pad 3, the sixth cushion pad 3 is first adhered to the first clamping plate 10, then the display device 30 is placed on the first clamping plate 10, and then the sixth cushion pad 3 is adhered to the second clamping plate 20, thereby achieving the assembly of the display module 1.

In the embodiments of the present disclosure, the third cushion pad 25, the fourth cushion pad 26, the fifth cushion pad 27 and the sixth cushion pad 3 may be cushion pads with flexibility such as silica gel, rubber or the like; and further, they may also have an anti-slip effect.

It will be noted that, an application range of the adapter 2 provided by the embodiments of the present disclosure is not limited to the baffle member 1011, and the adapter 2 may be used in any scenario where a plate-like object needs to be connected to the object in the external environment.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display assembly, comprising:
   a display device having at least one active area; and
   a first clamping plate and a second clamping plate disposed on two opposite sides of the display device in a thickness direction of the display device, wherein
   at least one of the first clamping plate and the second clamping plate is located on at least one light-exiting side of the display device, respectively; and at least a partial region of a portion, covering an active area of the display device, in a clamping plate located on a light-exiting side of the display device is in a transparent state;
   edges of the first clamping plate and the second clamping plate each have at least one adapter portion, and adapter portions are configured to fix the display assembly to an object in an external environment through at least one adapter;
   the display device includes:
   a display module; and
   a signal converter board coupled to the display module, the signal converter board being disposed between the first clamping plate and the second clamping plate, and being arranged side by side with the display module; and the signal converter board being configured to receive an image signal, and convert a format of the image signal to generate a screen driving control signal;
   the display module is a double-sided display module; and
   the double-sided display module includes:
   a first display module and a second display module that are arranged back to back; and
   an encapsulation housing disposed on a periphery of the first display module and the second display module, the encapsulation housing being configured to fix the first display module and the second display module.

2. The display assembly according to claim 1, wherein the signal converter board has a first signal interface and a second signal interface;
   the first display module includes:
   a first display panel;
   a first driving circuit board coupled to the first display panel, the first driving circuit board having a third signal interface; and
   a first flexible circuit board coupled to the first signal interface and the third signal interface; and
   the second display module includes:
   a second display panel;
   a second driving circuit board coupled to the second display panel, the second driving circuit board having a fourth signal interface; and
   a second flexible circuit board coupled to the second signal interface and the fourth signal interface.

3. The display assembly according to claim 2, wherein the first display panel and the second display panel each have an active area and a peripheral area disposed around the active area, and the peripheral area includes a first sub-region and a second sub-region located on two opposite sides of the active area in a first direction;
   two opposite sides of the double-sided display module in the first direction are a first side and a second side;
   the first sub-region of the first display panel and the second sub-region of the second display panel are located at the first side of the double-sided display module, and the second sub-region of the first display panel and the first sub-region of the second display panel are located at the second side of the double-sided display module; and boundaries of the active areas of the first display panel and the second display panel completely overlap;
   a portion of the first driving circuit board and a portion of the second driving circuit board are disposed in first sub-regions of corresponding display panels, respectively, the third signal interface is located at the first side of the double-sided display module, and the fourth signal interface is located at the second side of the double-sided display module; and
   the encapsulation housing includes a side wall facing side faces of the first display panel and the second display panel, and the side wall is provided with at least one circuit board penetration opening; and the at least one circuit board penetration opening is configured to allow the first flexible circuit board coupled to the third signal interface and the second flexible circuit board coupled to the fourth signal interface to penetrate.

4. The display assembly according to claim 3, wherein the at least one circuit board penetration opening includes one circuit board penetration opening, and the circuit board penetration opening is disposed at a position on the side wall corresponding to the third signal interface;
    after being coupled to the third signal interface, the first flexible circuit board directly passes through the circuit board penetration opening; and
    after being coupled to the fourth signal interface, the second flexible circuit board passes through a gap between the first display panel and the second display panel, and passes through the circuit board penetration opening.

5. The display assembly according to claim 4, wherein a dimension of the first sub-region in the first direction is greater than a dimension of the second sub-region in the first direction;
    at the first side of the double-sided display module, in a direction that is away from the active area in the first direction, a portion, extending beyond the second display panel, in the first sub-region of the first display panel sequentially includes a first width portion and a second width portion; and a thickness of the first width portion is greater than a thickness of the second width portion, and the third signal interface is disposed on the second width portion, and is located on a back face of the first display panel;
    at the second side of the double-sided display module, in a direction that is away from the active area in the first direction, a portion, extending beyond the first display panel, in the first sub-region of the second display panel sequentially includes a third width portion and a fourth width portion; and a thickness of the third width portion is greater than a thickness of the fourth width portion, and the fourth signal interface is disposed on the fourth width portion, and is located on a back face of the second display panel;
    the double-sided display module further includes a first fixing member and a second fixing member; and
    a portion of the second flexible circuit board located between a portion, coupled to the fourth signal interface, of the second flexible circuit board and a portion, between the first display panel and the second display panel, of the second flexible circuit board is fixed on a surface, proximate to the first display panel, of the third width portion of the second display panel through the first fixing member; and a portion of the second flexible circuit board located between the portion, between the first display panel and the second display panel, of the second flexible circuit board and a portion, located at the third signal interface, of the second flexible circuit board is fixed to a surface, proximate to the second display panel, of the first width portion of the first display panel through the second fixing member.

6. The display assembly according to claim 3, wherein the third signal interface and the fourth signal interface are located on a same straight line extending in the first direction.

7. The display assembly according to claim 1, wherein the double-sided display module further includes a plurality of connectors, and each connector includes:
    a first surface and a second surface disposed opposite to each other;
    a third surface and a fourth surface that are both connected to the first surface and the second surface and are disposed opposite to each other;
    at least one first connection hole disposed in the first surface and extends toward the second surface;
    at least one second connection hole disposed in the second surface and extends toward the first surface; and
    at least one third connection hole disposed in the third surface and extend toward the fourth surface;
    the first display module further includes a plurality of first connection portions, and the second display module further includes a plurality of second connection portions; the encapsulation housing includes side walls opposite to side faces of the first display panel and the second display panel, and the encapsulation housing further includes a plurality of third connection portions disposed on the side walls; and positions of the plurality of connectors, the plurality of first connection portions, the plurality of second connection portions and the plurality of third connection portions are in one-to-one correspondence;
    the connector is disposed on a side of a side wall of the encapsulation housing proximate to the first display panel and the second display panel, and the fourth surface of the connector is closer to the first display panel and the second display panel than the third surface; and each third connection portion corresponds to a third connection hole of a connector;
    each first connection portion is connected to a connector through at least one first connection hole of the connector, and each second connection portion is connected to a connector through at least one second connection hole of the connector; or, each first connection portion is connected to a connector through at least one second connection hole of the connector, and each second connection portion is connected to a connector through at least one first connection hole of the connector; and
    each third connection portion is connected to a connector through at least one third connection hole of the connector, so that the first display module and the second display module are fixed by the encapsulation housing.

8. The display assembly according to claim 7, wherein in a direction pointing from the fourth surface to the third surface, a thickness of the connector increases stepwise, and the thickness of the connector refers to a dimension of the connector in a direction pointing from the second surface to the first surface.

9. The display assembly according to claim 8, wherein the connector includes a fourth connection portion and a fifth connection portion that are sequentially arranged in the direction pointing from the fourth surface to the third surface;
    the fourth connection portion and the fifth connection portion are of an integral structure, a side face of the fourth connection portion away from the fifth connection portion is the fourth surface, and a side face of the fifth connection portion away from the fourth connection portion is the third surface;
    a thickness of the fifth connection portion is greater than a thickness of the fourth connection portion; a portion of the first surface corresponding to the fourth connection portion is retracted toward the second surface relative to a portion of the first surface corresponding to the fifth connection portion; and a portion of the second surface corresponding to the fourth connection portion is retracted toward the first surface relative to a portion of the second surface corresponding to the fifth connection portion; and
    the at least one first connection hole and the at least one second connection hole are both disposed in the fourth connection portion.

10. The display assembly according to claim 9, wherein the first display panel and the second display panel each have an active area and a peripheral area disposed around the active area, and the peripheral area includes a first sub-region and a second sub-region located on two opposite sides of the active area in a first direction;
  two opposite sides of the double-sided display module in the first direction are a first side and a second side;
  a first sub-region of the first display panel and a first sub-region of the second display panel are located at the first side of the double-sided display module, and a second sub-region of the first display panel and a second sub-region of the second display panel are located at the second side of the double-sided display module; and boundaries of active areas of the first display panel and the second display panel completely overlap;
  the plurality of first connection portions are disposed at sides of the first sub-region and the second sub-region of the first display panel away from the active area, and the plurality of second connection portions are disposed at sides of the first sub-region and the second sub-region of the second display panel away from the active area; and
  a first connection portion is connected to the fourth connection portion through at least one first connection hole, and a second connection portion is connected to the fourth connection portion through at least one second connection hole.

11. The display assembly according to claim 8, wherein the connector includes a sixth connection portion, a seventh connection portion and an eighth connection portion that are sequentially arranged in the direction pointing from the fourth surface to the third surface;
  the sixth connection portion, the seventh connection portion and the eighth connection portion are of an integral structure, a side face of the sixth connection portion away from the eighth connection portion is the fourth surface, and a side face of the eighth connection portion away from the sixth connection portion is the third surface;
  a thickness of the eighth connection portion is greater than a thickness of the seventh connection portion, and the thickness of the seventh connection portion is greater than at least one thickness of the sixth connection portion; a portion of the first surface corresponding to the seventh connection portion is flush with a portion of the first surface corresponding to the eighth connection portion; and a portion of the second surface corresponding to the seventh connection portion is retracted toward the first surface relative to a portion of the second surface corresponding to the eighth connection portion;
  a portion of the first surface corresponding to the sixth connection portion is retracted toward the second surface relative to the portion of the first surface corresponding to the seventh connection portion; and a portion of the second surface corresponding to the first connection portion is retracted toward the first surface relative to the portion of the second surface corresponding to the eighth connection portion; and
  the at least one first connection hole is disposed in the sixth connection portion, and the at least one second connection hole is disposed in the seventh connection portion.

12. The display assembly according to claim 11, wherein the sixth connection portion includes a first sub-portion and a second sub-portion that are sequentially arranged in the direction pointing from the fourth surface to the third surface; and the first sub-portion and the second sub-portion are of an integrated structure; and
  a thickness of the first sub-portion is smaller than a thickness of the second sub-portion; a portion of the first surface corresponding to the first sub-portion is flush with a portion of the first surface corresponding to the second sub-portion; a portion of the second surface corresponding to the first sub-portion is retracted toward the first surface relative to a portion of the second surface corresponding to the second sub-portion; and the portion of the second surface corresponding to the second sub-portion is flush with the portion of the second surface corresponding to the seventh connection portion.

13. The display assembly according to claim 11, wherein the first display panel and the second display panel each have an active area and a peripheral area disposed around the active area, and the peripheral area includes a first sub-region and a second sub-region located on two opposite sides of the active area in a first direction; and a dimension of the first sub-region in the first direction is greater than a dimension of the second sub-region in the first direction;
  two opposite sides of the double-sided display module in the first direction are a first side and a second side;
  a first sub-region of the first display panel and a second sub-region of the second display panel are located at the first side of the double-sided display module, and a second sub-region of the first display panel and a first sub-region of the second display panel are located at the second side of the double-sided display module; and boundaries of active areas of the first display panel and the second display panel completely overlap;
  the plurality of first connection portions are disposed at sides, away from the active area, of the first sub-region and the second sub-region of the first display panel, and the plurality of second connection portions are disposed at sides, away from the active area, of the first sub-region and the second sub-region of the second display panel; and
  at the first side of the double-sided display module, a first connection portion is connected to a seventh connection portion through at least one second connection hole, and a second connection portion is connected to a sixth connection portion through at least one first connection hole; and
  at the second side of the double-sided display module, a first connection portion is connected to a sixth connection portion through at least one first connection hole, and a second connection portion is connected to a seventh connection portion through at least one second connection hole.

14. The display assembly according to claim 1, wherein the encapsulation housing includes a first housing and a second housing;
  in a thickness direction of the double-sided display module and in a direction perpendicular to one side of the double-sided display module, sections of the first housing and the second housing are both L-shaped; and a side wall of the first housing and a side wall of the second housing overlap at side faces of the first display module and the second display module, so that the first housing and the second housing enclose a space with a U-shaped section;
  in a case where the encapsulation housing includes a circuit board penetration opening, at least one overlapping side wall of the first housing and/or the second housing is provided with a penetration sub-opening, and the penetration sub-opening forms at least part of the circuit board penetration opening; and in a case where the encapsulation housing includes third connection portions with a through-hole structure, overlapping side walls of the first housing and the second housing are each provided with a sub-through hole, and two sub-through holes corresponding in positions overlap to form a third connection portion.

15. A baffle member, comprising:

the display assembly according to claim 1; and at least one adapter disposed on a periphery of the display assembly, the adapter being configured to be connected to adapter portions in the first clamping plate and the second clamping plate of the display assembly to fix the display assembly to the object in the external environment.

16. The baffle member according to claim 15, wherein the adapter includes:

a first adapter plate and a second adapter plate that are disposed opposite to and separated from each other;

a fixing pin disposed between the first adapter plate and the second adapter plate; the fixing pin being connected to one of the first adapter plate and the second adapter plate; an adapter portion in the first clamping plate is a first through hole, an adapter portion in the second clamping plate is a second through hole, and the fixing pin penetrates through the first through hole and the second through hole, so that an edge of the display assembly is caught between the first adapter plate and the second adapter plate; and a fixing block connected to the first adapter plate and the second adapter plate, the fixing block including a fixing portion, and the adapter is fixed to the object in the external environment through the fixing portion.

17. A display apparatus, comprising:

the baffle member according to claim 15;

a controller coupled to the display device in the baffle member, the controller being configured to receive an original image signal, and convert a format of the original image signal to generate an image signal; and in a case where the display device includes a signal converter board, the controller being coupled to the signal converter board; and a connection line for connecting the controller and the display device.

18. A vehicle, comprising:

a vehicle body, the vehicle body including a shell body and a carriage body disposed inside the shell body; and the display apparatus according to claim 17 disposed in the vehicle body, the display assembly of the baffle member of the display apparatus being fixed in the carriage body through the at least one adapter; and the controller of the display apparatus being disposed between the carriage body and the shell body.

* * * * *